US012542901B2

United States Patent
Kang et al.

(10) Patent No.: US 12,542,901 B2
(45) Date of Patent: *Feb. 3, 2026

(54) IMAGE ENCODING/DECODING METHOD AND APPARATUS, AND RECORDING MEDIUM STORING BITSTREAM

(71) Applicant: Electronics and Telecommunications Research Institute, Daejeon (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,731

(22) Filed: Jul. 17, 2023

(65) Prior Publication Data

US 2023/0362369 A1      Nov. 9, 2023

Related U.S. Application Data

(63) Continuation of application No. 17/277,467, filed as application No. PCT/KR2019/012059 on Sep. 18, 2019, now Pat. No. 11,729,383.

(30) Foreign Application Priority Data

Sep. 19, 2018  (KR) .................. 10-2018-0112278
Sep. 28, 2018  (KR) .................. 10-2018-0116517
Dec. 31, 2018  (KR) .................. 10-2018-0174121

(51) Int. Cl.
    *H04N 19/119*     (2014.01)
    *H04N 19/172*     (2014.01)
    *H04N 19/174*     (2014.01)

(52) U.S. Cl.
    CPC ........ *H04N 19/119* (2014.11); *H04N 19/172* (2014.11); *H04N 19/174* (2014.11)

(58) Field of Classification Search
    CPC .. H04N 19/119; H04N 19/172; H04N 19/174; H04N 19/157; H04N 19/597;
    (Continued)

(56) References Cited

U.S. PATENT DOCUMENTS

| 11,729,383 B2* | 8/2023 | Kang ............ H04N 19/70 375/240.12 |
| 2021/0160493 A1* | 5/2021 | Han ............ H04N 19/176 |
| 2021/0211663 A1* | 7/2021 | Wang ............ H04N 19/184 |

FOREIGN PATENT DOCUMENTS

| KR | 100772576 B1 | 11/2007 |
| KR | 1020160104090 A | 9/2016 |

(Continued)

OTHER PUBLICATIONS

Gary J. Sullivan, Draft Text of H.263+, 1. VCEG Meeting; Jun. 24, 1997-Jun. 27, 1997, Document: ITU-LBC-97-094R2, Portland, OR, US, (Videocoding Experts Group of ITU-T SG.16) No. q15a05, May 9, 1997.

(Continued)

*Primary Examiner* — Tat C Chio
(74) *Attorney, Agent, or Firm* — Sughrue Mion, PLLC

(57) ABSTRACT

An image encoding/decoding method is disclosed. An image decoding method of the present invention may comprise deriving slice mode information on a slice included in a current picture, deriving slice identification information on (Continued)

the basis of the slice mode information, and decoding the slice on the basis of the slice identification information.

19 Claims, 28 Drawing Sheets

(58) Field of Classification Search
CPC .... H04N 19/70; H04N 19/176; H04N 19/124; H04N 19/167; H04N 19/436; H04N 19/503; H04N 19/593; H04N 19/60
See application file for complete search history.

(56) References Cited

FOREIGN PATENT DOCUMENTS

| WO | 2001086962 | A1 | 11/2001 |
|---|---|---|---|
| WO | 2013018909 | A1 | 2/2013 |
| WO | 2014005087 | A2 | 1/2014 |
| WO | 2015152605 | A1 | 10/2015 |
| WO | 2018066988 | A1 | 4/2018 |
| WO | 2020111023 | A1 | 6/2020 |

OTHER PUBLICATIONS

Kiran Misra et al., Tiles, Joint Collaborative Team on Video Coding (JCT-VC) of ITU-T SG16 WP3 and ISO/IEC JTC1/SC29/WG11, Document: JCTVC-E412, 5th Meeting: Geneva, CH, Mar. 16-23, 2011, SHARP, Mar. 12, 2011.

Sachin Deshpande et al., On Tile Grouping, Joint Video Experts Team (JVET) of ITU-T SG 16 WP 3 and ISO/IEC JTC 1/SC 29/WG 11, Document: JVET-M0853-v2, 13th Meeting: Marrakech, MA, Jan. 9-18, 2019, Sharp Labs of America, Inc., Huawei, Nokia, Interdigital, MediaTek, Samsung, Tencent, Ericsson, HHI, Jan. 12, 2019.

Ye-Kui Wang et al., Tile groups, Joint Collaborative Team on Video Coding (JCT-VC) of ITU-T SG16 WP3 and ISO/IEC JTC1/SC29/WG11, Document: JCTVC-H0520r1, 8th Meeting: San José, CA, USA, Feb. 1-10, 2012, Qualcomm Incorporated, Jan. 31, 2012.

Yukinobu Yasugi et al., AHG12: Flexible Tile Partitioning, Joint Video Experts Team (JVET) of ITU-T SG 16 WP 3 and ISO/IEC JTC 1/SC 29/WG 11, JVET-K0155-v1, 11th Meeting: Ljubljana, SI, Jul. 10-18, 2018, Sharp Corporation.

\* cited by examiner

FIG. 10

| #1 | #2 | #3 | #4 | #5 | ...... | #(N-2) | #(N-1) | #N |
|---|---|---|---|---|---|---|---|---|
| #(N+1) | #(N+2) | #(N+3) | #(N+4) | #(N+5) | ...... | #(2N-2) | #(2N-1) | #(2N) |
| #(2N+1) | #(2N+2) | #(2N+3) | #(2N+4) | #(2N+5) | ...... | #(3N-2) | #(3N-1) | #(3N) |
| ...... | | | | | | | | |
| #(KN+1) | #(KN+2) | #(KN+3) | #(KN+4) | #(KN+5) | ... | #{(K+1)*(N-2)} | #{(K+1)*(N-1)} | #(K+1)N |
| ... | | | | | ... | | | |

FIG. 11

| Tile #1 | | | | | | | Tile #2 | | | | | | | Tile #3 | | | | | | |
|---|---|---|---|---|---|---|---|---|---|---|---|---|---|---|---|---|---|---|---|---|
| #1 | #2 | #3 | #4 | #5 | #6 | #7 | #29 | #30 | #31 | #32 | #33 | #34 | #35 | #57 | #58 | #59 | #60 | #61 | #62 | #63 |
| #8 | #9 | #10 | #11 | #12 | #13 | #14 | #36 | #37 | #38 | #39 | #40 | #41 | #42 | #64 | #65 | #66 | #67 | #68 | #69 | #70 |
| #15 | #16 | #17 | #18 | #19 | #20 | #21 | #43 | #44 | #45 | #46 | #47 | #48 | #49 | #71 | #72 | #73 | #74 | #75 | #76 | #77 |
| #22 | #23 | #24 | #25 | #26 | #27 | #28 | #50 | #51 | #52 | #53 | #54 | #55 | #56 | #78 | #79 | #80 | #81 | #82 | #83 | #84 |

FIG. 12

| Tile #1 | | | | | | | Tile #2 | | | | | | | Tile #3 | | | | | | |
|---|---|---|---|---|---|---|---|---|---|---|---|---|---|---|---|---|---|---|---|---|
| #1 | #2 | #3 | #4 | #5 | #6 | #7 | #8 | #9 | #10 | #11 | #12 | #13 | #14 | #15 | #16 | #17 | #18 | #19 | #20 | #21 |
| ... | | | | | | | | | | | | | | | | | | | | |
| | | | | | | | | | | | | | | | | | | | | |
| | | | | | | | | | | | | | | | | | | | | |

FIG. 13

| | | | | | | | Tile #1 | | | | | | | Tile #2 | | | | | | | Tile #3 | | | | | | | Tile #4 | | | | | | |
|---|---|---|---|---|---|---|---|---|---|---|---|---|---|---|---|---|---|---|---|---|---|---|---|---|---|---|---|---|---|---|---|---|---|
| #1 | #2 | #3 | #4 | #5 | #6 | #7 | | #29 | #30 | #31 | #32 | #33 | #34 | #35 | | #113 | #114 | #115 | #116 | #117 | #118 | #119 | | #141 | #142 | #143 | #144 | #145 | #146 | #147 |
| #8 | #9 | #10 | #11 | #12 | #13 | #14 | | #36 | #37 | #38 | #39 | #40 | #41 | #42 | | #120 | #121 | #122 | #123 | #124 | #125 | #126 | | #148 | #149 | #150 | #151 | #152 | #153 | #154 |
| #15 | #16 | #17 | #18 | #19 | #20 | #21 | | #43 | #44 | #45 | #46 | #47 | #48 | #49 | | #127 | #128 | #129 | #130 | #131 | #132 | #133 | | #155 | #156 | #157 | #158 | #159 | #160 | #161 |
| #22 | #23 | #24 | #25 | #26 | #27 | #28 | | #50 | #51 | #52 | #53 | #54 | #55 | #56 | | #134 | #135 | #136 | #137 | #138 | #139 | #140 | | #162 | #163 | #164 | #165 | #166 | #167 | #168 |
| #57 | #58 | #59 | #60 | #61 | #62 | #63 | | #85 | #86 | #87 | #88 | #89 | #90 | #91 | | #169 | #170 | #171 | ... | | | | | | | | | | | |
| #64 | #65 | #66 | #67 | #68 | #69 | #70 | | #92 | #93 | #94 | #95 | #96 | #97 | #98 | | | | | | | ... | #196 | | | | | | | #197 | ... |
| #71 | #72 | #73 | #74 | #75 | #76 | #77 | | #99 | #100 | #101 | #102 | #103 | #104 | #105 | | | | | | | | | | | | | | | | |
| #78 | #79 | #80 | #81 | #82 | #83 | #84 | | #106 | #107 | #108 | #109 | #110 | #111 | #112 | | | | | | | | | | | | | | | | #224 |
| | | | Tile #5 | | | | | | | | Tile #6 | | | | | | | | Tile #7 | | | | | | | | Tile #8 | | | | |

| Tile #1 | | | | | | | Tile #2 | | | | | | | Tile #3 | | | | | | | Tile #4 | | | | | | |
|---|---|---|---|---|---|---|---|---|---|---|---|---|---|---|---|---|---|---|---|---|---|---|---|---|---|---|---|
| #1 | #2 | #3 | #4 | #5 | #6 | #7 | #8 | #9 | #10 | #11 | #12 | #13 | #14 | #15 | #16 | #17 | #18 | #19 | #20 | #21 | #22 | #23 | #24 | #25 | #26 | #27 | #28 |
| #29 | #30 | #31 | #32 | #33 | #34 | #35 | #36 | #37 | #38 | #39 | #40 | #41 | #42 | #43 | #44 | #45 | #46 | #47 | #48 | #49 | #50 | #51 | #52 | #53 | #54 | #55 | #56 |
| #57 | #58 | #59 | #60 | #61 | #62 | #63 | #64 | #65 | #66 | #67 | #68 | #69 | #70 | #71 | #72 | #73 | #74 | #75 | #76 | #77 | #78 | #79 | #80 | #81 | #82 | #83 | #84 |
| #85 | #86 | #87 | #88 | #89 | #90 | #91 | #92 | #93 | #94 | #95 | #96 | #97 | #98 | #99 | #100 | #101 | #102 | #103 | #104 | #105 | #106 | #107 | #108 | #109 | #110 | #111 | #112 |
| #113 | #114 | #115 | #116 | #117 | #118 | #119 | #120 | #121 | #122 | #123 | #124 | #125 | #126 | #127 | #128 | #129 | #130 | #131 | #132 | #133 | #134 | #135 | #136 | #137 | #138 | #139 | #140 |
| #141 | #142 | #143 | #144 | #145 | #146 | #147 | #148 | #149 | #150 | #151 | #152 | #153 | #154 | #155 | #156 | #157 | #158 | #159 | #160 | #161 | #162 | #163 | #164 | #165 | #166 | #167 | #168 |
| #169 | #170 | #171 | ... | | | | | | | | | | | | | | | | | | | | | | | | |
| Tile #5 | | | | | | | Tile #6 | | | | | | | Tile #7 | | | | | | | Tile #8 | | | | | | |

| ... parameter_set_rbsp( ) { | Descriptor |
|---|---|
| ... | |
| tiles_enabled_flag | u(1) |
| ... | |
| if( tiles_enabled_flag ) { | |
| tile_column_size_unit | ue(v) |
| tile_row_size_unit | ue(v) |
| num_tile_columns_minus1 | ue(v) |
| num_tile_rows_minus1 | ue(v) |
| loop_filter_across_tiles_enabled_flag | u(1) |
| } | |
| ... | |

FIG. 19

| ... parameter_set_rbsp( ) { | Descriptor |
|---|---|
| ... | |
|    tiles_enabled_flag | u(1) |
| ... | |
|    if( tiles_enabled_flag ) { | |
|       tile_size_unit | ue(v) |
|       num_tile_columns_minus1 | ue(v) |
|       num_tile_rows_minus1 | ue(v) |
|       loop_filter_across_tiles_enabled_flag | u(1) |
|    } | |
| ... | |

FIG. 20

| Tile #1 | Tile #2 | Tile #3 | Tile #4 |
|---|---|---|---|
| Tile #5 | Tile #6 | Tile #7 | Tile #8 |
| Tile #9 | Tile #10 | Tile #11 | Tile #12 |

FIG. 21

| ... parameter_set_rbsp( ) { | Descriptor |
|---|---|
| ... | |
|    tiles_enabled_flag | u(1) |
| ... | |
|    if( tiles_enabled_flag ) { | |
|       tile_size_unit<br>      (or tile_column_size_unit, tile_row_size_unit) | |
|       num_tile_columns_minus1 | ue(v) |
|       num_tile_rows_minus1 | ue(v) |
|       uniform_spacing_flag | u(1) |
|       if( !uniform_spacing_flag ) { | |
|          for( i = 0; i < num_tile_columns_minus1; i++ ) | |
|             column_width_minus1[ i ] | ue(v) |
|          for( i = 0; i < num_tile_rows_minus1; i++ ) | |
|             row_height_minus1[ i ] | ue(v) |
|       } | |
|       loop_filter_across_tiles_enabled_flag | u(1) |
|    } | |
| ... | |

FIG. 22

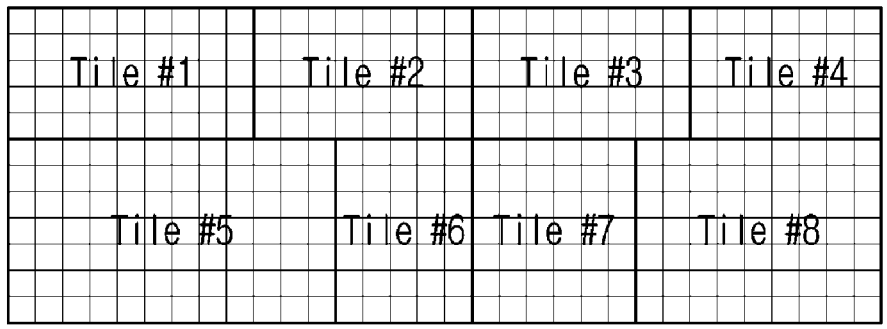

FIG. 23

| ... parameter_set_rbsp( ) { | Descriptor |
|---|---|
| ... | |
| tiles_enabled_flag | u(1) |
| ... | |
| if( tiles_enabled_flag ) { | |
| tile_size_unit (or tile_column_size_unit, tile_row_size_unit) | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_rows_minus1; i++ ){ | |
| row_height_minus1[ i ] | ue(v) |
| for( j = 0; j < num_tile_columns_minus1; i++ ) | |
| column_width_minus1[i][j] | ue(v) |
| } | |
| } | |
| loop_filter_across_tiles_enabled_flag | u(1) |
| } | |
| ... | |

FIG. 24

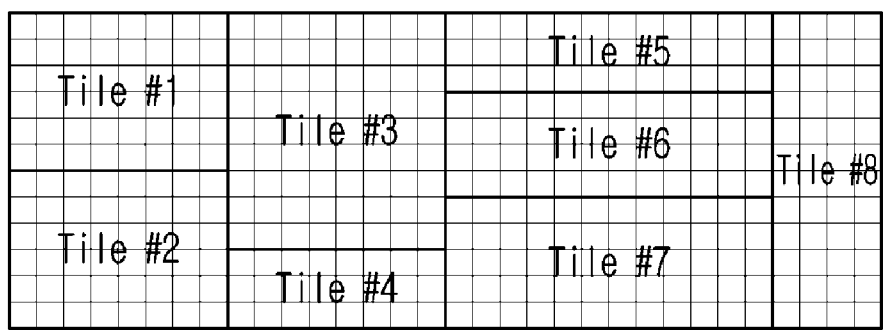

FIG. 25

| ... parameter_set_rbsp( ) { | Descriptor |
|---|---|
| ... | |
| tiles_enabled_flag | u(1) |
| ... | |
| if( tiles_enabled_flag ) { | |
| tile_size_unit (or tile_column_size_unit, tile_row_size_unit) | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1; i++ ){ | |
| column_width_minus1[i] | ue(v) |
| for( j = 0; j < num_tile_rows_minus1; i++ ) | |
| row_height_minus1[i][j] | ue(v) |
| } | |
| } | |
| loop_filter_across_tiles_enabled_flag | u(1) |
| } | |
| ... | |

FIG. 26

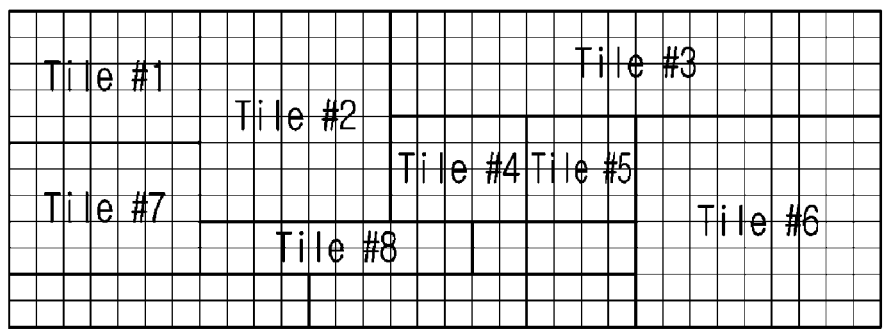

FIG. 27

| ... parameter_set_rbsp( ) { | Descriptor |
|---|---|
| ... | |
|     tiles_enabled_flag | u(1) |
| ... | |
|     if( tiles_enabled_flag ) { | |
|         tile_size_unit (or tile_column_size_unit, tile_row_size_unit) | ue(v) |
|         uniform_spacing_flag | u(1) |
|         if(uniform_spacing_flag) { | u(1) |
|             num_tile_columns_minus1 | u(1) |
|             num_tile_rows_minus1 | ue(v) |
|         } else { | |
|             num_tile_in_picture_minus1 | ue(v) |
|             for (i=0; i < num_tile_in_picture_minus1; i++){ | |
|                 column_width_minus1[i] | ue(v) |
|                 row_height_minus1[i] | ue(v) |
|             } | |
|         } | |
|         loop_filter_across_tiles_enabled_flag | u(1) |
|     } | |
| ... | |

FIG. 28

| ... parameter_set_rbsp( ) { | Descriptor |
|---|---|
| ... | |
|    tiles_enabled_flag | u(1) |
| ... | |
|    if( tiles_enabled_flag ) { | |
|       tile_size_unit (or tile_column_size_unit, tile_row_size_unit) | ue(v) |
|       uniform_spacing_flag | u(1) |
|       if(uniform_spacing_flag) { | u(1) |
|          num_tile_columns_minus1 | u(1) |
|          num_tile_rows_minus1 | ue(v) |
|       } else { | |
|          num_tile_in_picture_minus1 | ue(v) |
|          for (i=0; i < num_tile_in_picture_minus1; i++){ | |
|             top_left_tile_unit_idx[i] | ue(v) |
|             bottom_right_tile_unit_idx[i] | ue(v) |
|          } | |
|       } | |
|       loop_filter_across_tiles_enabled_flag | u(1) |
|    } | |
| ... | |

FIG. 29

| ... parameter_set_rbsp( ) { | Descriptor |
|---|---|
| ... | |
| tiles_enabled_flag | u(1) |
| ... | |
| if( tiles_enabled_flag ) { | |
|     tile_size_unit (or tile_column_size_unit, tile_row_size_unit) | |
|     uniform_spacing_flag | u(1) |
|     if(uniform_spacing_flag) { | u(1) |
|         num_tile_columns_minus1 | u(1) |
|         num_tile_rows_minus1 | ue(v) |
|     } else { | |
|         num_tile_in_picture_minus1 | |
|         for (i=0; i < num_tile_in_picture_minus1; i++){ | |
|             top_left_tile_unit_idx[i] | |
|             column_width_minus1[i] | |
|             row_height_minus1[i] | |
|         } | |
|     } | |
|     loop_filter_across_tiles_enabled_flag | u(1) |
| } | |
| ... | |

FIG. 30

| ... parameter_set_rbsp( ) { | Descriptor |
|---|---|
| ... | |
| tiles_enabled_flag | u(1) |
| ... | |
| if( tiles_enabled_flag ) { | |
|     tile_size_unit (or tile_column_size_unit, tile_row_size_unit) | ue(v) |
|     num_tiles_in_picture | ue(v) |
|     for (i=0; i < num_tiles_in_picture; i++) { | |
|         if (i > 0) | |
|             use_previous_tile_size_flag | u(1) |
|         if (use_previous_tile_size_flag == 0) { | |
|             top_left_tile_unit_idx[i] | ue(v) |
|             bottom_right_tile_unit_idx[i] | ue(v) |
|         } | |
|     } | |
|     loop_filter_across_tiles_enabled_flag | u(1) |
| } | |
| ... | |

FIG. 31

| ... parameter_set_rbsp( ) { | Descriptor |
|---|---|
| ... | |
|     tiles_enabled_flag | u(1) |
| ... | |
|     if( tiles_enabled_flag ) { | |
|         tile_size_unit (or tile_column_size_unit, tile_row_size_unit) | ue(v) |
|         num_tiles_in_picture | ue(v) |
|         for (i=0; i < num_tiles_in_picture; i++) { | |
|             if (i > 0) | |
|                 use_previous_tile_size_flag | u(1) |
|             if (use_previous_tile_size_flag == 0) { | |
|                 top_left_tile_unit_idx[i] | ue(v) |
|                 column_width_minus1[i] | ue(v) |
|                 row_height_minus1[i] | ue(v) |
|             } | |
|         } | |
|         loop_filter_across_tiles_enabled_flag | u(1) |
|     } | |
| ... | |

FIG. 32

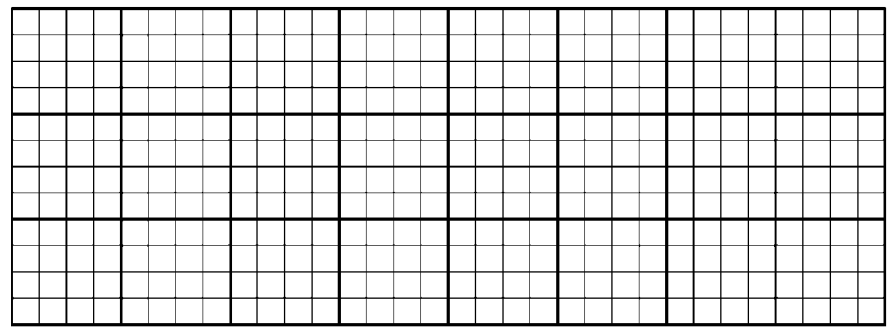

FIG. 34

| ... parameter_set_rbsp( ) { | Descriptor |
|---|---|
| ... | |
| tiles_enabled_flag | u(1) |
| ... | |
| if( tiles_enabled_flag ) { | |
| subtile_size_unit (or subtile_column_size_unit, subtile_row_size_unit) | |
| num_subtile_columns_minus1 | ue(v) |
| num_subtile_rows_minus1 | ue(v) |
| uniform_spacing_flag | u(1) |
| if( !uniform_spacing_flag ) { | |
| for( i = 0; i < num_subtile_columns_minus1; i++ ) | |
| column_width_minus1[ i ] | ue(v) |
| for( i = 0; i < num_subtile_rows_minus1; i++ ) | |
| row_height_minus1[ i ] | ue(v) |
| } | |
| num_tiles_in_picture | |
| for (i=0; i < num_tiles_in_picture; i++) { | |
| if (i > 0) | |
| use_previous_tile_size_flag | |
| if (use_previous_tile_size_flag == 0) { | |
| top_left_subtile_idx[i] | |
| bottom_right_subtile_idx[i] | |
| } | |
| } | |
| loop_filter_across_tiles_enabled_flag | u(1) |
| } | |
| ... | |

FIG. 35

| ... parameter_set_rbsp( ) { | Descriptor |
|---|---|
| ... | |
|     tiles_enabled_flag | u(1) |
|     ... | |
|     if( tiles_enabled_flag ) { | |
| subtile_size_unit (or subtile_column_size_unit, subtile_row_size_unit) | |
|         num_subtile_columns_minus1 | ue(v) |
|         num_subtile_rows_minus1 | ue(v) |
|         uniform_spacing_flag | u(1) |
|         if( !uniform_spacing_flag ) { | |
|             for( i = 0; i < num_subtile_columns_minus1; i++ ) | |
|                 column_width_minus1[ i ] | ue(v) |
|             for( i = 0; i < num_subtile_rows_minus1; i++ ) | |
|                 row_height_minus1[ i ] | ue(v) |
|         } | |
|     num_tiles_in_picture | |
|     for (i=0; i < num_tiles_in_picture; i++) { | |
|         if (i > 0) | |
|             use_previous_tile_size_flag | |
|         if (use_previous_tile_size_flag == 0) { | |
|             top_left_subtile_idx[i] | |
|             column_width_minus1[i] | |
|             row_height_minus1[i] | |
|         } | |
|     } | |
|     loop_filter_across_tiles_enabled_flag | u(1) |
|     } | |
|     ... | |

(a)                    (b)

(a)            (b)

IMAGE ENCODING/DECODING METHOD AND APPARATUS, AND RECORDING MEDIUM STORING BITSTREAM

CROSS-REFERENCE TO RELATED APPLICATIONS

The present application is a continuation application of U.S. application Ser. No. 17/277,467, filed on Mar. 18, 2021, which was the National Stage of International Application No. PCT/KR2019/012059 filed on Sep. 18, 2019, which claims priority to Korean Patent Applications: KR10-2018-0112278, filed on Sep. 19, 2018, KR10-2018-0116517, filed on Sep. 28, 2018, and KR10-2018-0174121, filed on Dec. 31, 2018 with the Korean Intellectual Property Office, which are incorporated herein by reference in their entirety.

TECHNICAL FIELD

The present invention relates to an image encoding/decoding method and apparatus. More particularly, the present invention relates to an image encoding/decoding method and apparatus performing tile-based partitioning of a picture and signaling of partitioning information.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved encoding/decoding efficiency.

Another object of the present invention is to provide an image encoding/decoding method and apparatus performing encoding/decoding effectively by partitioning a picture in a various form.

Another object of the present invention is to provide an image encoding/decoding method and apparatus performing signaling effectively partition information of a picture.

Another object of the present invention is to provide a recording medium storing a bitstream generated by an image encoding method/apparatus of the present invention.

Another object of the present invention is to provide a recording medium storing a bitstream which is received, decoded and used by an image decoding apparatus according to the present invention to reconstruct an image.

Technical Solution

An image decoding method according to an embodiment of the present invention may comprise deriving slice mode information on a slice included in a current picture, deriving slice identification information on the basis of the slice mode information, and decoding the slice on the basis of the slice identification information.

In the image decoding method of the present invention, the slice mode information may indicate whether a mode of the slice included in the current picture is a first mode configured with continuous tiles according to a raster scan order or a second mode configured with at least one sub-tile forming a rectangle region.

In the image decoding method of the present invention, the slice mode information may be signaled through a picture parameter set.

In the image decoding method of the present invention, when the slice mode information indicates the first mode, the slice identification information may include index information on a first sub-tile included in the slice, and information on a number of sub-tiles included in the slice.

In the image decoding method of the present invention, the slice identification information may be signaled through a slice header.

In the image decoding method of the present invention, an index of the first sub-tile included in the slice may be determined on the basis of the slice identification information, and an index of an n-th sub-tile included in the slice may be set to a value obtained by adding 1 to an index of an (n−1)-th sub-tile included in the slice.

In the image decoding method of the present invention, when the slice mode information indicates the second mode, the slice identification information may include index information on a lower-right sub-tile within the slice, and a slice identifier.

In the image decoding method of the present invention, the index information of the lower-right sub-tile within the slice may represent a difference value between an index of the lower-right sub-tile within a current slice and an index of a lower-right sub-tile within a previous slice.

In the image decoding method of the present invention, the difference value may be signaled by using information on an absolute value of the difference value and sign information on the difference value.

In the image decoding method of the present invention, the information on the absolute value of the difference value and the sign information on the difference value may be signaled through a picture parameter set.

An image encoding method according to another embodiment of the present invention may comprise determining a slice mode on a slice included in a current picture and encoding slice mode information indicating the determined slice mode, determining slice identification information on the basis of the slice mode and encoding the determined slice identification information, and encoding the slice on the basis of the slice identification information.

In the image encoding method of the present invention, the slice mode information may indicate whether a mode of the slice included in the current picture is a first mode configured with continuous tiles according to a raster scan order or a second mode configured with at least one sub-tile forming a rectangle region.

In the image encoding method of the present invention, the slice mode information may be signaled through a picture parameter set.

In the image encoding method of the present invention, when the slice mode is the first mode, the slice identification information may include index information on a first sub-tile included in the slice, and information on a number of sub-tiles included in the slice.

In the image encoding method of the present invention, the slice identification information may be signaled through a slice header.

In the image encoding method of the present invention, an index of the first sub-tile included in the slice may be encoded using the slice identification information, and an index of an n-th sub-tile included in the slice may be a value obtained by adding 1 to an index of an (n−1)-th sub-tile included in the slice.

In the image encoding method of the present invention, when the slice mode is the second mode, the slice identification information may include index information on a lower-right sub-tile within the slice, and a slice identifier.

In the image encoding method of the present invention, the index information of the lower-right sub-tile within the slice may represent a difference value between an index of the lower-right sub-tile within a current slice and an index of a lower-right sub-tile within a previous slice.

In the image encoding method of the present invention, the difference value may be signaled by using information on an absolute value of the difference value and sign information on the difference value.

A recording medium according to another embodiment of the present invention may be a non-transitory computer-readable recording medium storing a bitstream which is received, decoded and used to reconstruct an image by an image decoding apparatus, wherein the bitstream may comprise slice mode information and slice identification information on a slice included in a current picture, the slice mode information may be used to derive the slice identification information, and the slice identification information may be used to decode the slice.

A computer-readable recording medium according to another embodiment of the present invention may store a bitstream generated by an image encoding method and/or apparatus according to the present invention.

Advantageous Effects

According to the present invention, an image encoding/decoding method and apparatus with improved encoding/decoding efficiency may be provided.

Also, according to the present invention, an image encoding/decoding method and apparatus performing encoding/decoding effectively by partitioning a picture in a various form may be provided.

Also, according to the present invention, an image encoding/decoding method and apparatus performing signaling effectively partition information of a picture may be provided.

Also, according to the present invention, a recording medium storing a bitstream generated by an image encoding method/apparatus of the present invention.

Also, according to the present invention, a recording medium storing a bitstream which is received, decoded and used by an image decoding apparatus according to the present invention to reconstruct an image.

DESCRIPTION OF DRAWINGS

FIG. 10 is a view of an example showing an identifier of an absolute position of a CTU within a picture when performing encoding and decoding.

FIG. 11 is a view of an example of assigning addresses of CTUS within a tile.

FIG. 12 is a view showing a process of converting a tile CTU address into a picture CTU address.

FIG. 13 is a view showing another example of assigning a CTU address within a tile.

FIG. 15 is a view showing another example of assigning a CTU address within a tile.

FIG. 16 is a view showing an example of a picture CTU address.

FIG. 19 is a view showing another example of signaling tile related information.

FIG. 20 is a view showing an example of configuring a picture with tiles having different horizontal lengths and vertical lengths.

FIG. 21 is a view showing still another example of signaling tile related information.

FIG. 22 is a view showing an example of partitioning a picture into tiles with various sizes.

FIG. 23 is a view showing an example of signaling tile related information according to an example of FIG. 22.

FIG. 24 is a view showing another example of partitioning a picture into tiles with various sizes.

FIG. 25 is a view showing an example of signaling tile related information according to an example of FIG. 24.

FIG. 26 is a view showing another example of partitioning a picture into tiles with various sizes.

FIG. 27 is a view showing an example of signaling a horizontal length and a vertical length of each tile included in a picture.

FIG. 28 is a view showing an example of signaling an upper-left position and a lower-right position of each tile included in a picture.

FIG. 29 is a view showing an example of signaling an upper-left position of each tile included in a picture, and a horizontal length and a vertical length of a tile.

FIG. 30 is a view showing another example of signaling tile related information.

FIG. 31 is a view showing still another example of signaling tile related information.

FIG. 32 is a view showing an example of partitioning a picture into sub-tiles.

FIG. 34 is a view showing an example of signaling a size and a position of a sub-tile.

FIG. 35 is a view showing another example of signaling a size and a position of a sub-tile.

MODE FOR INVENTION

Figure 1:
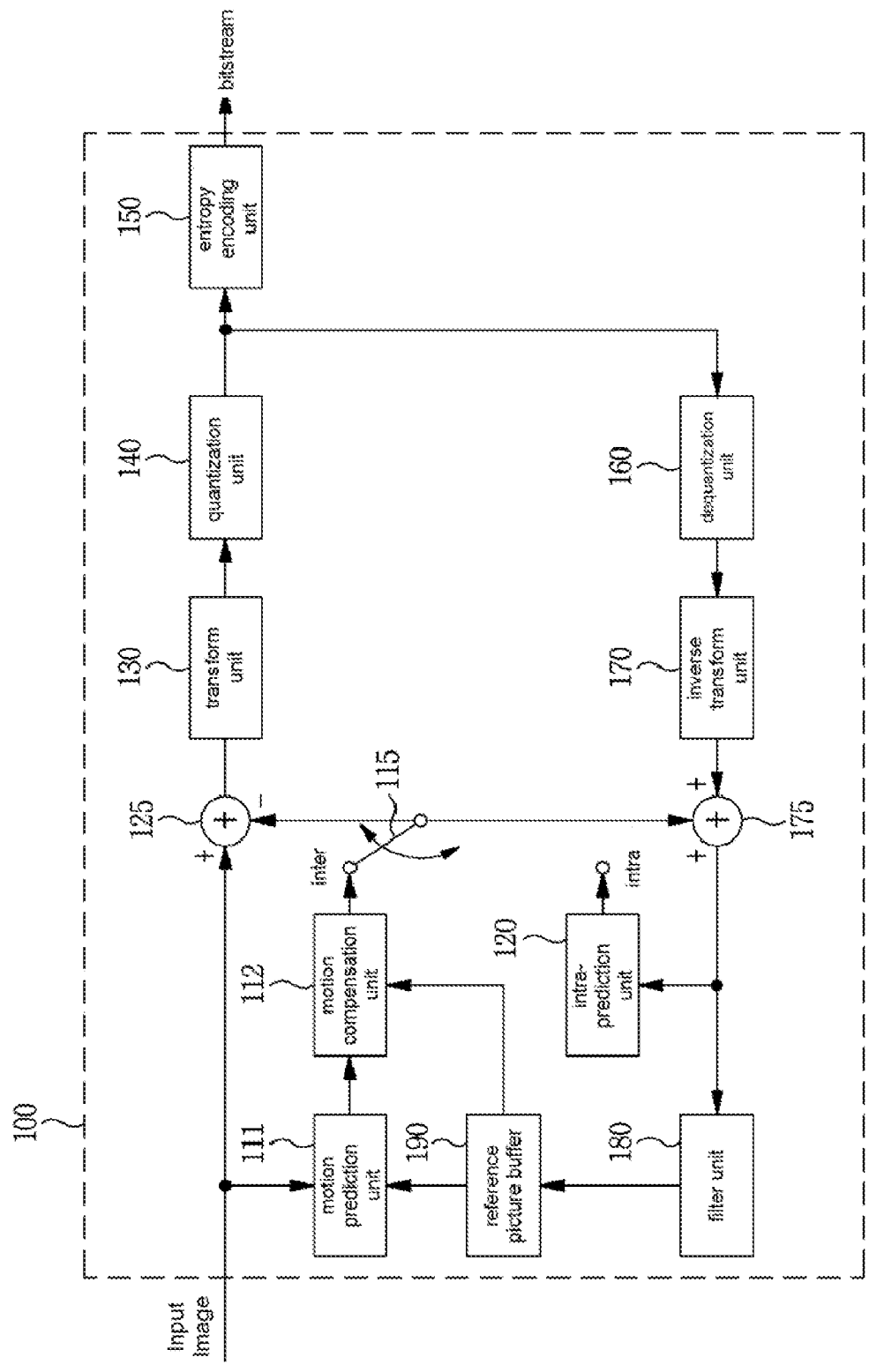
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{B_d}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture in a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
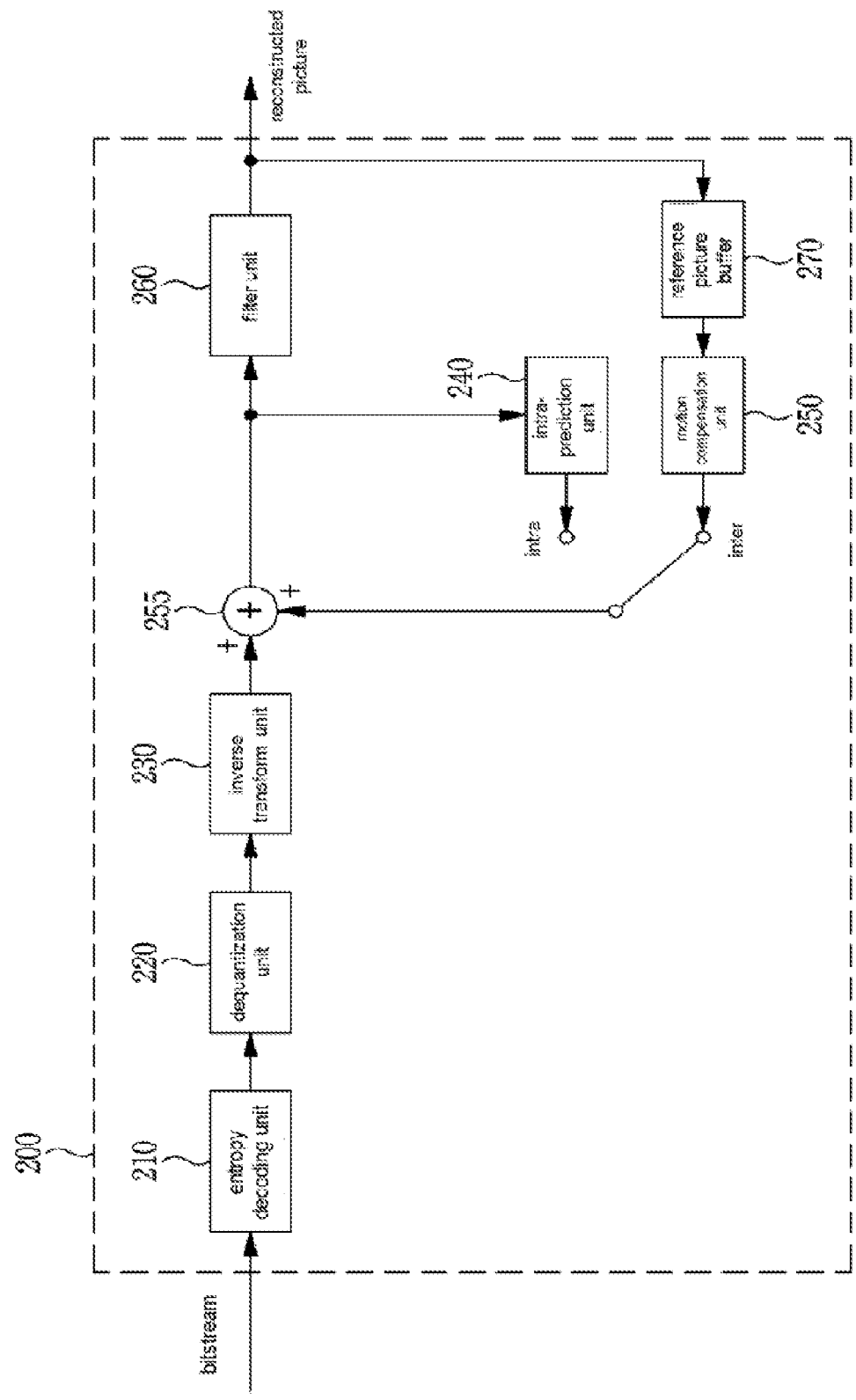
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
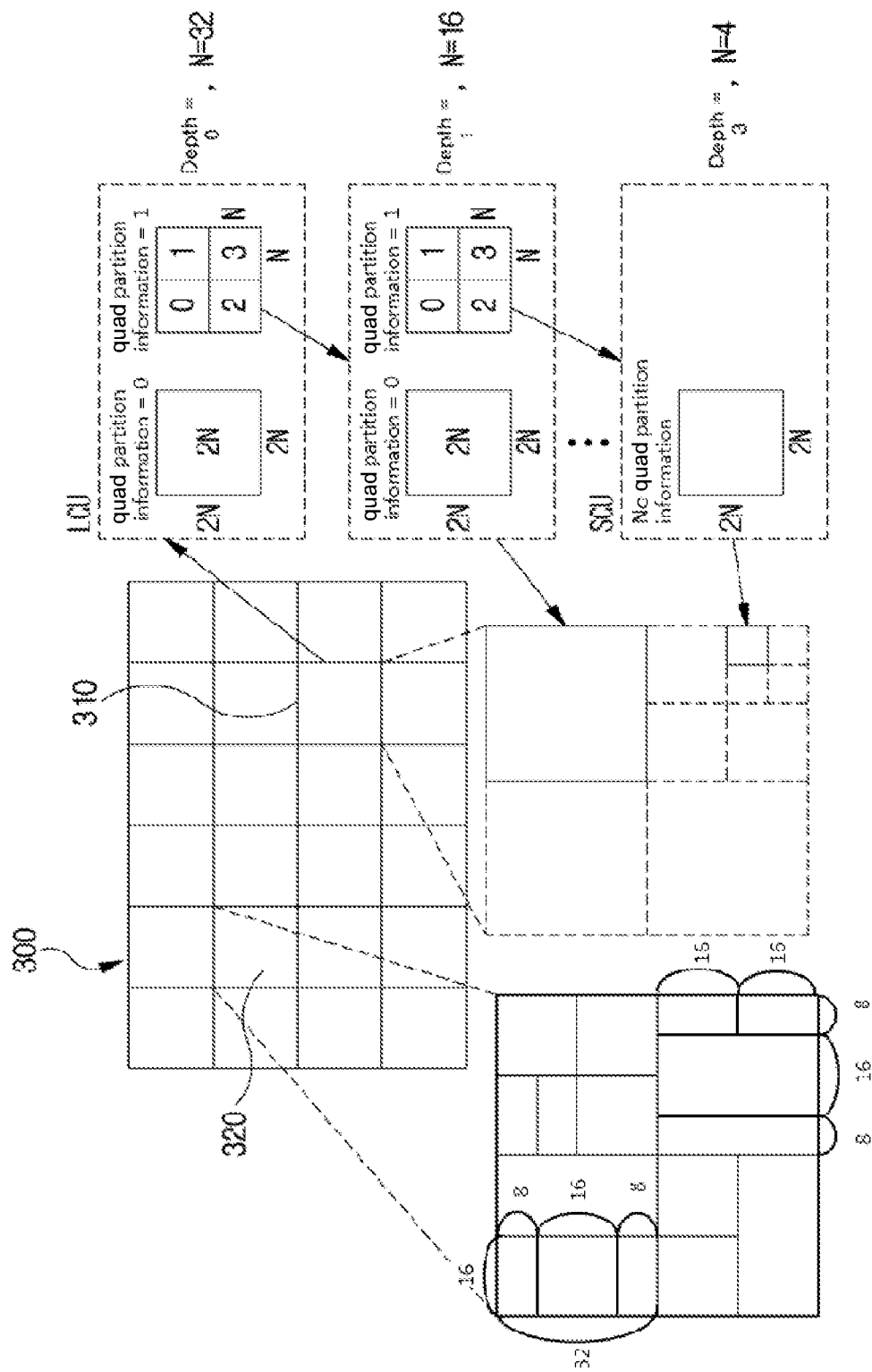
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
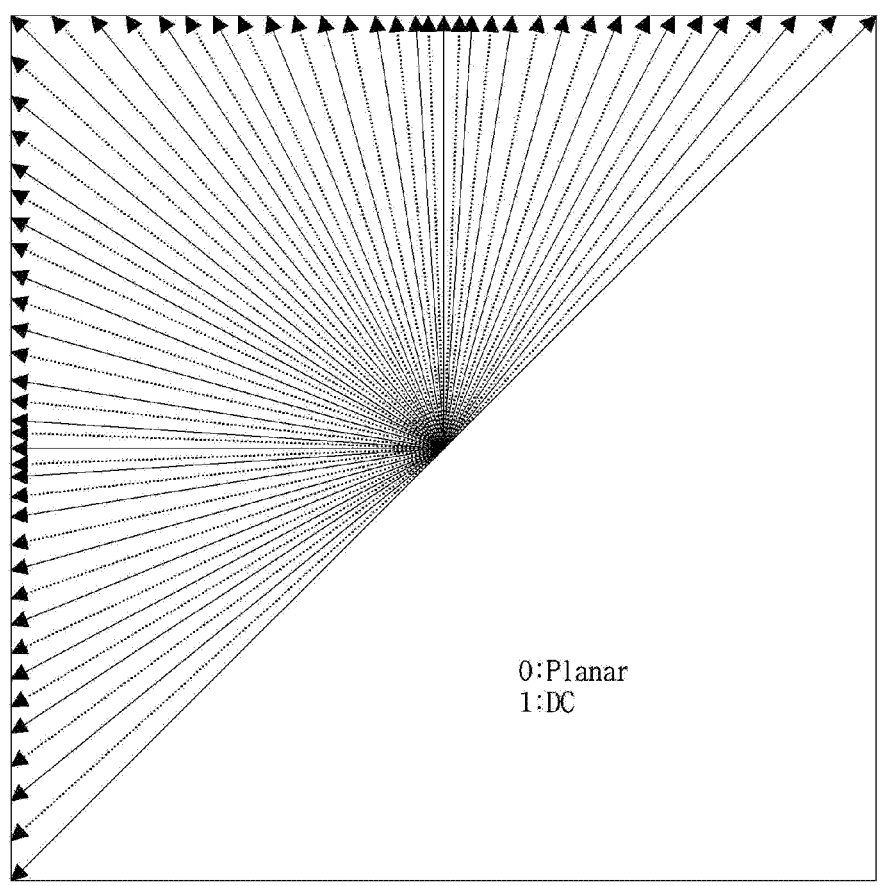
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
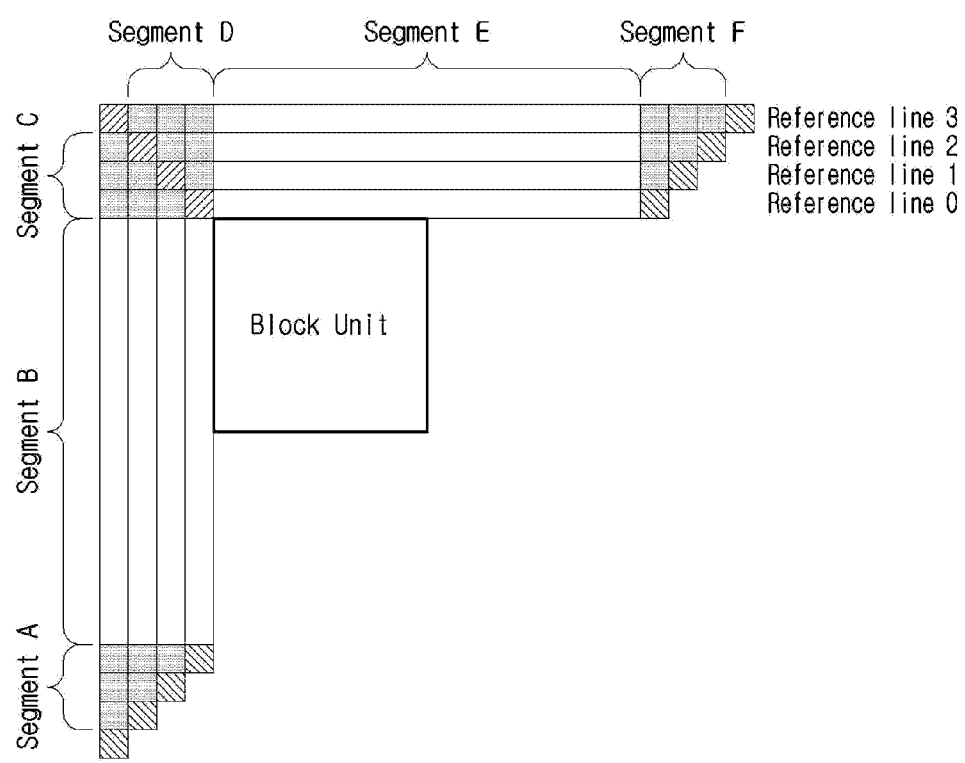
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of a left upper side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
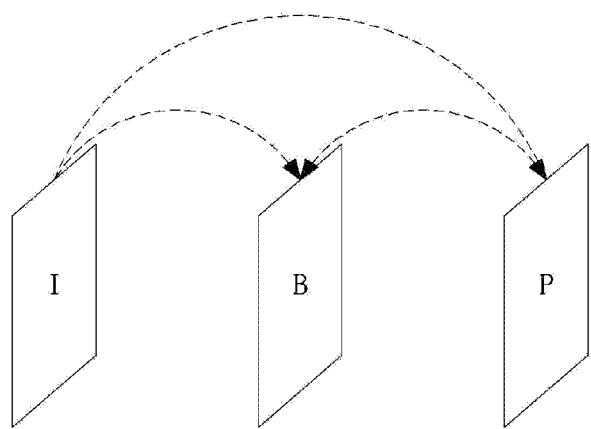
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current block may be the merge mode. The merge mode may mean a method of merging motion information of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information existing in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
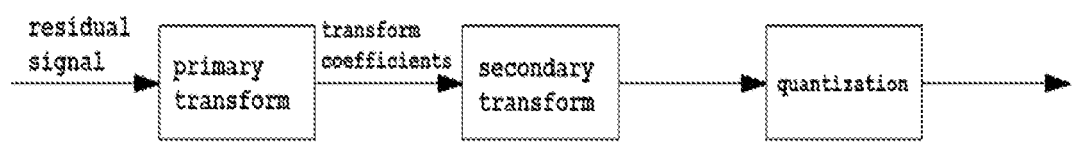
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block) The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loeve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, various embodiments of a method of partitioning a picture according to the present invention will be described with reference to the drawings.

A single picture may be partitioned into at least one rectangle region. In other words, a single picture may be configured with at least one rectangle region. A single rectangle region constituting a single picture may partially overlap with another rectangle. Herein, partial pixels constituting a rectangle region may overlap. The rectangle region may be referred to as a tile.

Each tile may be independently encoded and decoded except for in-loop filtering. By using the above feature, a tile may be used for parallel processing required as the encoder and the decoder become complicated. Alternatively, a tile may be used for providing a region of interests (ROI) within a picture.

A tile may be obtained by partitioning a picture in horizontal and vertical directions by an identical interval. Herein, tiles within a picture may have the same size (width and height). Partitioning a picture into tiles with the same size as described above is not efficient in various aspects which will be described later.

When a plurality of regions constituting a picture is respectively processed in parallel, encoding and decoding may vary in complexity for each region within a picture. For example, within a region or picture with complex texture, a large bit rate may be assigned for regions classified as important regions. The above regions may increase more in encoding and decoding times than other regions.

In the above case, when a picture is partitioned into tiles with the same size and parallel processing is performed therefor, encoding and decoding times vary for each tile. Accordingly, efficiency of parallel processing can be decreased. Accordingly, in order to maximize efficiency of parallel processing, it is preferable for tiles to differ in size for each region according to a feature of each region within a picture. In other words, tiles with various sizes are present within the same picture.

When an ROI is provided, a size of an ROI within a picture may not be constant. In addition, it is preferable to partition a region other than an ROI within a picture into as few tiles as possible in terms of encoding efficiency. Accordingly, in order to provide an efficient ROI, a picture may be partitioned into tiles with various sizes for each region within a picture.

Meanwhile, various methods of providing tiles with various sizes within the same picture may be present, and various methods of flexibly providing tiles with various sizes may be also present. The present invention proposes various methods for improving efficiency of performing parallel processing and providing an ROI.

A single picture may be configured with a single slice or at least one tile group.

Fundamentally, each tile included in a tile group may be independently encoded and decoded except for in-loop filtering. However, when a picture is partitioned into many tiles, encoding efficiency can be decreased. In order to solve the above problem, prediction for each tile included in a tile group may be performed by referring to a region of another tile within the same tile group.

For example, when encoding and decoding tiles included in a tile group, intra-prediction may be performed by using a value of a reconstructed sample included in the same tile group. Herein, a reconstructed sample belonging to another tile within the same tile group may be also used for prediction of a current tile.

In addition to intra-prediction, information of another tile included in the same tile group may be used for performing inter-prediction, in-loop filtering, entropy encoding/decoding. Herein, an indicator (flag, index, etc.) representing whether or not to independently perform encoding and decoding between tiles may be signaled through a slice header, a tile group header, and a parameter set such as a picture parameter set, a sequence parameter set, and a picture header parameter set. Alternatively, an indicator representing whether or not to perform intra-prediction, an indicator representing whether or not to perform inter-prediction, an indicator representing whether or not to apply an in-loop filter to a tile boundary, an indicator representing whether or not to apply initialization of entropy encoding to each tile, etc. may be signaled through a slice header, a tile group header, and a parameter set such as a picture parameter set, a sequence parameter set, and a picture header parameter set.

When performing initialization of entropy encoding (CABAC) (for example, context initialization), for example, when initialization of entropy encoding is not performed for each tile (that is, when it is signaled that an indicator representing whether or not to apply initialization of entropy encoding to each tile indicates that initialization of entropy encoding is not applied to each tile), an initial value for entropy encoding an N-th tile belonging to a specific tile group may be set to an entropy state of one specific CTU of an (N−1)-th tile or previously encoded tile belonging to the corresponding tile group.

Meanwhile, except for in-loop filtering, encoding and decoding may be independently performed for each tile group. Herein, an indicator indicating whether or not to apply an in-loop filter to a boundary of a tile group may be signaled through a slice header, a tile group header, a parameter set such as a picture parameter set, a sequence parameter set, and a picture header parameter set.

A single slice (or tile group) may be configured with at least one tile. Herein, a single slice (or tile group) may be an independent transmission unit. For example, transmission may be performed on the basis of a single NALU (NAL Unit similar in HEVC or H.264). Accordingly, a single NALU may include a single slice (or tile group).

When at least two tiles are included in a slice (or tile group), a header of the corresponding slice (or tile group) may include in a bitstream information representing a start point of encoding information of each tile. Accordingly, decoding may be independently performed by obtaining encoding information of each tile which is included in a data part (payload) of the corresponding slice (or tile group) through the header of the slice (or tile group), and decoding may be only performed on a specific ROI. Herein, encoding information of a tile may be information on at least one of a prediction method required for reconstructing a pixel value of a CTU included in the corresponding tile, intra-prediction, inter-prediction, primary transform, secondary transform, quantization, in-loop filtering, etc.

Alternatively, a single slice may be configured with at least one tile group.

When a single slice is configured with at least one tile group, an independent transmission unit may be a slice. For example, a single NALU may include a single slice. Alternatively, when a single slice includes at least two tile groups, a slice header may include a start point where encoding information of each tile group starts in a bitstream. Alternatively, when a single tile group includes at least two tiles, a corresponding slice header thereof may also include a start point where encoding information of each tile starts in a bitstream.

When a single picture is configured with at least two tile groups, an order between tile groups may be an order of signaling tile groups or encoding and decoding orders of tile groups, and the order may be a predefined order. The predefined order may be, for example, a raster scan order.

An identifier of a tile group may be determined according to an order of signaling tile groups or encoding and decoding orders of tile groups. For example, an order of signaling tile groups or encoding and decoding orders of tile groups may be identical to an identifier of the tile group.

An order between tiles included in a tile group may be an order of signaling tiles within a tile group or encoding and decoding orders of the tiles. The order may be a predefined order, and the predefined order may be, for example, a raster scan order.

An identifier of a tile may be determined according to an order of signaling tiles or encoding and decoding orders of tiles within a tile group.

An order between CTUs included in a tile may be an order of signaling CTUs or encoding and decoding orders of CTUs. The order may be a predefined order, and the predefined order may be, for example, a raster scan order.

An address (identifier, index) of a CTU may be determined according to an order of signaling CTUs or encoding and decoding orders of CTUs within a tile.

Accordingly, when a tile group and tiles are present, a CTU address (identifier) increases in value from an upper-left CTU of the first tile of the first tile group of a picture to the last CTU of the corresponding tile in a raster scan order. Subsequently, the CTU address may increase in value from the first CTU (upper-left CTU) of the second tile of the corresponding tile group in a raster scan order. The CTU address repeatedly increases in value until the last CTU of the last tile of the corresponding tile group. Subsequently, the CTU address may increase in value from an upper-left CTU of the first tile of the second tile group in a raster scan order. The CTU address may continue increasing in value until the last tile of the last tile group.

is a view showing an example of a tile, a tile group, and a slice constituting a picture.

Figure 9:
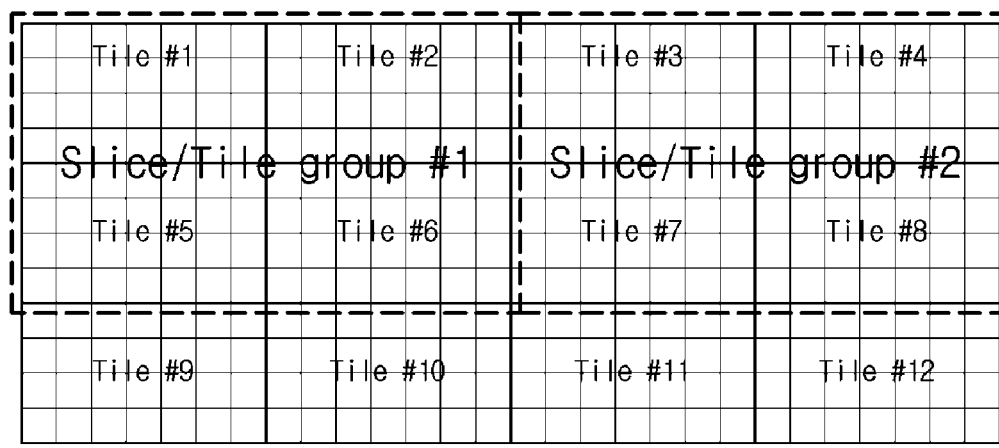
FIG. 9 is a view showing another example a tile, a tile group, and a slice constituting a picture.

FIG. 9 is a view showing another example a tile, a tile group, and a slice constituting a picture.

Figure 8:
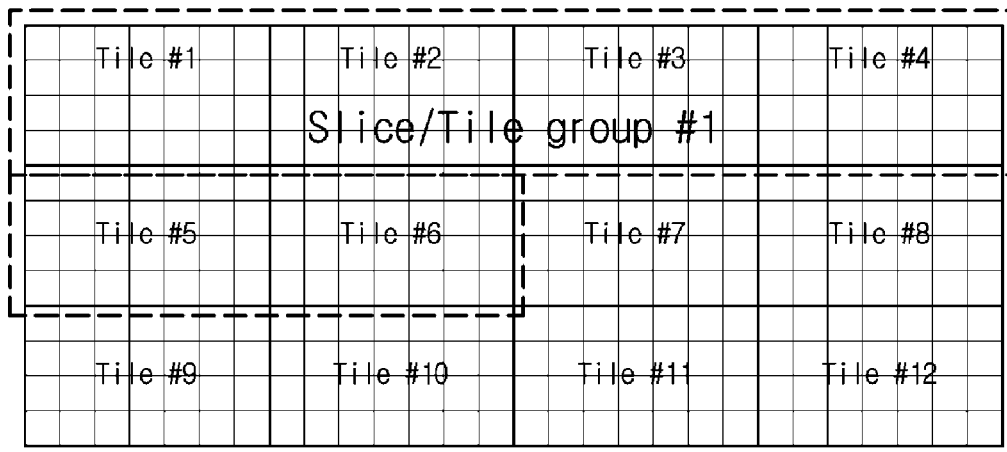
FIG. 8 is a view showing an example of a tile, a tile group, and a slice constituting a picture.

As shown in FIG. 8, a slice (or tile group) may include tiles in a raster scan order within a picture. Alternatively, as shown in FIG. 9, a slice (or tile group) may be configured with an arbitrary rectangle region within a picture.

Information on whether a slice (or tile group) constituting a picture is configured as an example of FIG. 8 or FIG. 9 may be signaled as slice (or tile group) mode information. Herein, slice (or tile group) mode information may be signaled through a parent level of the slice, for example, a picture parameter set or sequence parameter set.

As shown in FIG. 8, when a slice (or tile group) include tiles in a raster scan order within a picture, tiles or CTUs included in an N-th slice (or tile group) may be derived or specified on the basis of signaled information on at least one of below. Herein, N may be an arbitrary integer value. In the present specification, a tile may include a sub-tile. Accordingly, for example, in information below which is signaled, a tile may be replaced with a sub-tile.

An identifier (indicator or index) representing a tile included in the first (the first tile) and an identifier (indicator or index) representing a tile included in the last (the last tile) may be signaled. A corresponding slice (or tile group) may include all tiles from a tile indicated by the first tile indicator to a tile indicated by the last tile indicator.

Address information (identifier, index or indicator) of a CTU included in the first (the first CTU) and address information of a CTU included in the last (the last CTU may be signaled). CTUs included in a corresponding slice (or tile group) may be all CTUs from the first CTU to the last CTU.

Address information of a CTU included in the last (the last CTU) may be signaled. CTUs included in a corresponding slice (or tile group) may be CTUs from a CTU subsequent to a CTU included in the last in a previous slice (or tile group) to the last CTU. When the corresponding slice (or tile group) corresponds to the first slice (or tile group) of a picture, CTUs included in the corresponding slice (or tile group) may be CTUs from the first CTU to the last CTU of the corresponding picture.

Information on an identifier (indicator or index) representing a tile included in the first and a number of tiles included in a corresponding slice (or tile group) may be signaled. Tiles included in the corresponding slice (or tile group) may be from the first tile to a tile indicated by an M-th identifier (indicator or index). Herein, the M-th identifier may be derived as (identifier (indicator or index) of the first tile+(a number of tiles included in a tile group)−1). An identifier of the first tile within a slice (or tile group) may be reconstructed on the basis of the signaled identifier. An identifier of a tile of an afterward slice (or tile group) may be obtained by increasing an identifier of the just previous tile by 1.

An identifier (indicator or index) representing a tile included in the last may be signaled. An identifier of a tile included in the first in a corresponding slice (or tile group) may be derived as (identifier (indicator or index) of a tile included in the last in a previous slice (or tile group)+1). Tiles included in the corresponding slice (or tile group) may be from the first tile to the last tile. Herein, when the corresponding slice (or tile group) is the first slice (or tile group) of a corresponding picture, the first tile of the corresponding slice (or tile group) may be the first tile of the corresponding picture.

Information on a number of tiles included in a corresponding slice (or tile group) may be signaled. An identifier of a tile included in the first in the corresponding slice (or tile group) may be derived as (an identifier (indicator or index) of a tile included in the last in a previous slice (or tile group)+1). Tiles included in the corresponding slice (or tile group) may be from the first tile to a tile indicated by an M-th identifier (indicator or index). Herein, the M-th identifier may be derived as (an identifier (indicator or index) of the first tile+(a number of tiles included in a tile group)−1). In addition, when the corresponding slice (or tile group) is the first slice (or tile group) of a corresponding picture, the first tile of the corresponding slice (or tile group) may be the first tile of the corresponding picture.

As shown in FIG. 9, when a slice (or tile group) is an arbitrary rectangle region within a picture, tiles or CTUs included in a slice (or tile group) may be identified on the basis of signaled information on at least one of below. In the present specification, a tile may include a sub-tile. Accordingly, for example, in signaled information below, a tile may be replaced with a sub-tile.

An identifier of an upper-left tile and an identifier of a lower-right tile of a corresponding slice (or tile group) may be signaled.

An address (identifier or index) of an upper-left CTU and an address of a lower-right CTU of a corresponding slice (or tile group) may be signaled.

An identifier of an upper-left tile or CTU address of a corresponding slice (or tile group), and information on horizontal and vertical lengths of the corresponding slice (or tile group) may be signaled.

Information on horizontal and vertical lengths of a corresponding slice (or tile group) may be signaled. Herein, upper-left positional information of a corresponding slice (or tile group) may be derived from positional information of a previous slice (or tile group). However, when a corresponding slice (or tile group) is the first slice (or tile group) of a picture, the first tile or first CTU of the corresponding slice (or tile group) may be the first tile or CTU of the picture.

Alternatively, as shown in FIG. 9, when a slice (or tile group) is an arbitrary rectangle region within a picture, tiles or CTUs included in an N-th slice (or tile group) may be derived or identified on the basis of signaled information on at least one of below.

An identifier (indicator or index) representing a tile positioned at the upper-left of a corresponding slice (or tile group) may be signaled.

An identifier (indicator or index) representing a tile positioned at the lower-right of a corresponding slice (or tile group) may be signaled.

An address (identifier, index or indicator) of a CTU positioned at the upper-left of a corresponding slice (or tile group) may be signaled. That is, an address of the first CTU of a tile included in the first in a slice (or tile group) may be signaled.

An address of a CTU positioned at the lower-right of a corresponding slice (or tile group) may be signaled.

Information on a horizontal length and a vertical length of a corresponding slice (or tile group) may be signaled. Herein, information on a horizontal length and a vertical length may mean a number of tiles included in each of a horizontal or vertical direction, or may mean a number of CTUs.

An address of a CTU at a preset position of a slice (or tile group) may be signaled.

In the above example, information (identifier, indicator or index) on a position of an upper-left tile or position of a lower-right tile may be signaled by using various methods. For example, information on a position of an upper-left tile or position of a lower-right tile may be directly signaled. Alternatively, the information may be signaled by using a difference value between information on position of a tile of a previous slice (or tile group) and information on a position of a tile of a current slice (or tile group). For example, a difference value between an index of a lower-right tile of a previous slice (or tile group) and an index of a lower-right tile of a current slice (or tile group) may be signaled. Herein, a difference value may be signaled by using information on an absolute value of the corresponding difference value and a sign of the corresponding difference value. Herein, an index of a lower-right tile of the first slice (or tile group) may be directly signaled, and an index of a lower-right tile of an afterward slice (or tile group) may be signaled by using the above difference value. Accordingly, an index of a lower-right tile of a slice (or tile group) after the second slice (or tile group) may be derived by using a signaled difference value with an index of a lower-right tile of a previous slice (or tile group).

As shown in FIG. 9, when a slice (or tile group) is an arbitrary rectangle region within a picture, a slice identifier for identifying each slice included in the picture may be signaled through a slice header. When decoding a slice, a number of tiles included in the corresponding slice, an identifier of an upper-left tile of the corresponding slice, an identifier of a lower-right tile of the corresponding slice, etc. may be derived by using a slice identifier included in the corresponding slice header. For example, information on a number of tiles included in a slice, an identifier of an upper-left tile of the slice, an identifier of a lower-right tile of the slice, etc. may be derived in advance as information in a table form for a current picture. Subsequently, when decoding each slice included in a current picture, information related on the above corresponding slice information may be derived by referring to the information in the table form by using a slice identifier.

Comparing with a case where a single picture is configured with a single tile group and a single tile, when a single picture is partitioned into at least one tile group, and at least two tiles are included in the tile group or when a single picture is partitioned into at least two tile groups and at least one tile is included within the tile group, an order of encoding CTUs within the picture may vary. Alternatively, when at least one of a plurality of tile groups and a plurality of tiles is present within a single picture, an order of encoding CTUs within the picture may vary.

Accordingly, when an address (identifier or index) of a CTU included in a tile is assigned according to an encoding order, the address of the corresponding CTU becomes a relative address that varies according to at least one of a size and a shape of the tile, and a size and shape of a tile group. Accordingly, a method of identifying a position of the corresponding CTU within a picture is required. For example, one of the following methods may be used. An address of a CTU may be a CTB address of a luma component (luma sample) or CTB address of chroma components (chroma samples, Cb/Cr).

For example, an address of a CTU within a tile may be represented by an identifier representing a position (absolute position) of a CTU within a picture for performing encoding/decoding, and an identifier representing a position (relative position) of a CTU within the tile. An identifier representing an absolute position may be converted into an identifier representing a relative position of the CTU. In addition, for example, an identifier representing a relative position of a CTU may be converted into an identifier representing an absolute position of the CTU.

FIG. 10 is a view of an example showing an identifier of an absolute position of a CTU within a picture when performing encoding and decoding. The identifier of the absolute position shown in FIG. 10 may be identical to an address (relative address) of a CTU of a case where a single tile group and a single tile are present in a picture.

When a tile group is configured with a structure shown in FIG. 8, addresses of CTUs included in a tile within a picture and in a specific tile may be identified as below.

Tiles within a picture are identified in a raster scan order, and tile identifiers such as Tile #1, Tile #2, Tile #3 . . . may be assigned.

Addresses of CTUs may be increased in a raster scan order within a tile. In addition, a CTU order between tiles may be determined according to an encoding/decoding order between tiles (for example, raster scan order).

FIG. 11 is a view of an example of assigning addresses of CTUS within a tile.

For example, FIG. 11 is a view showing addresses of CTUs included in Tile #1, Tile #2, and Tile #3 of FIG. 8. As shown in FIG. 11, addresses of CTUs are increased within each tile in a raster scan order. In addition, an encoding/decoding order between tiles is an order of Tile #1, Tile #2, and Tile #3. Accordingly, Tile #1 includes CTU addresses of #1 to #28, Tile #2 includes CTU addresses of #29 to #56, and Tile #3 includes CTU addresses of #57 to #84.

CTU addresses within a tile (hereinafter, referred to as "tile CTU address") shown in FIG. 11 may be converted into identifiers representing absolute positions of CTUs within a picture (hereinafter, referred to as "picture CTU address") which are shown in FIG. 10.

FIG. 12 is a view showing a process of converting a tile CTU address into a picture CTU address.

For example, tile CTU addresses included in Tile #1 and Tile #2 of FIG. 11 may be converted into picture CTU addresses of FIG. 12, and then encoding and decoding may be performed.

Hereinafter, an embodiment of converting a picture CTU address into a tile CTU address will be described. In the present specification, a tile may include a sub-tile, and the tile may be replaced with the sub-tile.

First, an x coordinate and a y coordinate of a current CTU within a picture may be obtained. The picture may be partitioned into CTU rows and CTU columns, and the x coordinate may indicate an address of a CTU column to which a current CTU belongs, and the y coordinate may indicate an address of a CTU row to which the current CTU belongs. For example, an x coordinate may be a remainder obtained by dividing a picture CTU address of a current CTU by a number of CTUs which corresponds to a horizontal length of a current picture (CTU-based horizontal length (CTU-based width)). In addition, a y coordinate may be a quotient obtained by dividing a picture CTU address of a current CTU by a CTU-based horizontal length of a current picture. For example, in FIG. 10, when a picture CTU address of a current CTU is #(2N+4), an x coordinate may be obtained as 4, and a y coordinate may be obtained as 2.

After obtaining the x coordinate and the y coordinate of the current CTU within the picture, a current tile to which the current CTU belongs may be determined on the basis of the corresponding coordinates. For the same, for example, an address of a start CTU column of a tile, a CTU-based horizontal length of the tile, an address of a start CTU row of the tile, and a CTU-based vertical length (CTU-based height) of the tile may be used for each tile within the picture. In detail, first, the first tile (index 0) within a picture may be set as a target tile. Subsequently, whether a first condition that becomes true when an x coordinate of a current CTU within a picture is smaller than (a start CTU column of the target tile+a CTU-based horizontal length of the target tile) is satisfied or whether a second condition that becomes true when a y coordinate of the current CTU within the picture is smaller than (a start CTU row of the target tile+a CTU-based vertical length) is satisfied may be determined. When at least one of the first condition and the second condition is not satisfied, a subsequent tile (index+=1) is set as the target tile according to a raster scan order, and whether or not the first condition and the second condition are satisfied may be determined. The above process may be repeated until both of the first condition and the second condition are satisfied. When both of the first condition and the second condition are satisfied, the target tile (index n) may be determined as a current tile to which the current CTU belongs.

Finally, a tile CTU address for the picture CTU address of the current CTU may be obtained. In detail, first, a number of CTUs included in tiles from the first tile (index 0) to a just previous tile (index n−1) of the current tile (index n) within a picture may be calculated. For example, a number of CTUs included in a tile may be calculated by the product of a CTU-based horizontal length of the tile and a CTU-based vertical length of the tile. Accordingly, from an index 0 to an index n−1, by increasing the index by 1, a number of CTUs included in a tile of the corresponding index may be calculated, and the calculated values may be accumulated and summed. The accumulated value may be derived as a number of CTUs included in tiles from the first tile (index 0) to the just previous tile (index n−1) within the picture (a number of CTUs until the just previous tile). Subsequently, a number of CTUs preceding the current CTU within the current tile in a raster scan order may be obtained. For example, a number of CTUs (first number of CTUs) within a current tile until a row just previous to a current CTU row in which the current CTU is included may be calculated by multiplying a value obtained by subtracting an address of a start CTU row of the current tile from a y coordinate of the current CTU with a CTU-based horizontal length of the current tile. In addition, a value obtained by subtracting an address of a start CTU column of the current tile from an x coordinate of the current CTU corresponds to a number of CTUs (second number of CTUs) within a current CTU row until a column just previous to a current CTU column in which the current CTU is included. A value obtained by adding the first number of CTUs and the second number of CTUs may be determined as a number of CTUs preceding the current CTU within the current tile in a raster scan order (a number of preceding CTUs within the current tile). Subsequently, a tile CTU address for the picture CTU address of the current CTU may be obtained by adding the number of CTUs until the just previous tile and the number of preceding CTUs within the current tile.

The above-described process may be repeated by increasing the picture CTU address by 1 from the first CTU (picture CTU address=0) to the last CTU within the picture. By the above process, information in association with a picture CTU address and a tile CTU address for all CTUs included within a picture may be generated. For example, the information may be a form of a lookup table (first address conversion lookup table) where a tile CTU address is obtained by using a picture CTU address as an index.

Hereinafter, an embodiment of a method of converting a tile CTU address into a picture CTU address will be described. In the present specification, a tile may include a sub-tile. Hereinafter, a tile may be replaced with a sub-tile.

A tile CTU address may be converted into a picture CTU address by using the above-generated first address conversion lookup table. For example, a tile CTU address for a certain picture CTU address may be obtained by using the first address conversion lookup table. In other words, the obtained tile CTU address corresponds to the certain picture CTU address.

The above process may be repeated for CTUs from the first CTU (picture CTU address=0) to the last CTU within a picture by increasing a picture CTU address by 1. By the above process, information in association with a tile CTU address and a picture CTU address may be generated for all CTUs included in a picture. For example, the information may be a form of a lookup table (second address conversion lookup table) where a picture CTU address is obtained by using a tile CTU address as an index.

Hereinafter, an embodiment of identifying a tile in which a CTU is included by using a tile CTU address of the corresponding CTU will be described. In the present specification, a tile may include a sub-tile. Hereinafter, a tile may be replaced with a sub-tile. Herein identifying a tile may be performed by obtaining an identifier of the tile.

First, for each row from the first row to the last row of a tile of an index n, a picture CTU address of a CTU included in the corresponding tile may be calculated by moving from the first column to the last column. For example, an address of a start CTU row of a tile may be used as an address of the first row of the corresponding tile. In addition, (an address of a start CTU row+a CTU-based vertical length of the tile−1) may be used as an address of the last row of the corresponding tile. Similarly, an address of a start CTU column of the tile may be used as an address of the first column of the corresponding tile. In addition, (an address of a start CTU column+a CTU-based horizontal length of the tile−1) may be used as an address of the last column of the corresponding tile. A CTU within the corresponding tile may be present within a range of the row address and the column address. When an address of a CTU column of a CTU included in the corresponding tile is x, and an address of a CTU row of a CTU included in the corresponding tile is y, a picture CTU address of the CTU may be calculated by (a CTU-based horizontal length of the picture*(y−1)+x).

Subsequently, the calculated picture CTU address may be converted into a tile CTU address. For example, a tile CTU address of a corresponding CTU may be obtained by using the above-described first address conversion lookup table. In other words, a CTU having the obtained tile CTU address may be included in a tile of an index n.

The above process may be repeated for tiles from the first tile (index=0) to the last tile within a picture by increasing an index by 1. By the above process, information in association with a tile CTU address and a tile identifier (index) may be generated for all tiles included in a picture. For example, the information may be a form of a lookup table (third tile identification lookup table) where a tile identifier is obtained by using a tile CTU address as an index.

Hereinafter, an embodiment of identifying a tile CTU address of the first CTU included in a tile will be described. In the present specification, a tile may include a sub-tile. Hereinafter, a tile may be replaced with a sub-tile.

The first tile (tile identifier=0) within a picture may be set as an initial target tile, and an initial tile CTU address may be set to 0.

First, a tile CTU address of the first CTU of the target tile may be set as a current tile CTU address.

Subsequently, a tile CTU address of the last CTU within the target tile CTU may be identified. For example, whether a CTU of a corresponding tile CTU address and a CTU of a subsequent tile CTU address belong to tiles different from each other may be determined by increasing a tile CTU address by 1. For the same, for example, the third tile identification lookup table may be used. When the CTUs belong to the same tile, the tile CTU address may be increased by 1, and the above determination may be repeated. When the CTUs belong to tiles different from each other, the corresponding tile CTU address may be identified as a tile CTU address of the last CTU within the target tile. Alternatively, when a corresponding tile CTU address indicates the last tile within a picture, the corresponding tile CTU address may be identified as a tile CTU address of the last CTU within the target tile CTU.

A tile CTU address subsequent to the last tile CTU address may be set as a tile CTU address of the first CTU of a subsequent target tile. When the subsequent tile is not present, the above process may be omitted.

The above-described process may be performed for all tiles within a picture. By the above process, information in association with a tile identifier (index) and a tile CTU address of the first CTU within a corresponding tile may be generated for all tiles included within a picture. For example, the information may be a form of a lookup table (fourth lookup table for the first CTU within tile) where a tile CTU address of the first CTU within a corresponding tile is obtained by using a tile identifier as an index.

When a tile group is configured with a structure shown in FIG. 9, a tile included within a picture and CTU addresses included within a specific tile may be identified as below.

- Tiles within a picture may be identified in a raster scan order, and tile identifiers such as Tile #1, Tile #2, Tile #3 . . . may be assigned.
- However, an encoding/decoding order between tiles may be a raster scan order between tiles belonging to an arbitrary tile group.
- An encoding/decoding order between tile groups may be a raster scan order between tile groups.

In an example shown in FIG. 9, an encoding/decoding order between tile groups may be an order of a tile group #1 (Tile group #1), and a tile group #2 (Tile group #2). In addition, an encoding/decoding order between tiles included in the tile group #1 may be an order of Tile #1, Tile #2, Tile #5, and Tile #6. In addition, an encoding/decoding order between tiles included in the tile group #2 may be an order of Tile #3, Tile #4, Tile #7, and Tile #8. Accordingly, in the example shown in FIG. 9, an encoding/decoding order between tiles may be an order of Tile #1, Tile #2, Tile #5, Tile #6, Tile #3, Tile #4, Tile #7, and Tile #8.

A CTU address (tile CTU address) within an arbitrary tile may be increased in a raster scan order.

FIG. 13 is a view showing another example of assigning a CTU address within a tile.

In an example shown in FIG. 9, addresses of CTUs included in Tile #1, Tile #2, Tile #3, Tile #5, Tile #6, Tile #7, and Tile #8 may be represented as shown in FIG. 13. In other words, Tile #1 may include CTU addresses of #1 to #28, Tile #2 may include CTU addresses of #29 to #56, and Tile #5 may include CTU addresses of #57 to #84.

Tile CTU addresses shown in FIG. 13 may be converted into picture CTU addresses shown in FIG. 10. For example, tile CTU addresses included in Tile #1, Tile #2, and Tile #3 shown in FIG. 13 may be converted into picture CTU addresses shown in FIG. 12, and then encoding and decoding may be performed.

Alternatively, when a tile group is configured with a structure shown in FIG. 9, a tile included within a picture and CTU addresses included within a specific tile may be identified as below.

Figure 14:
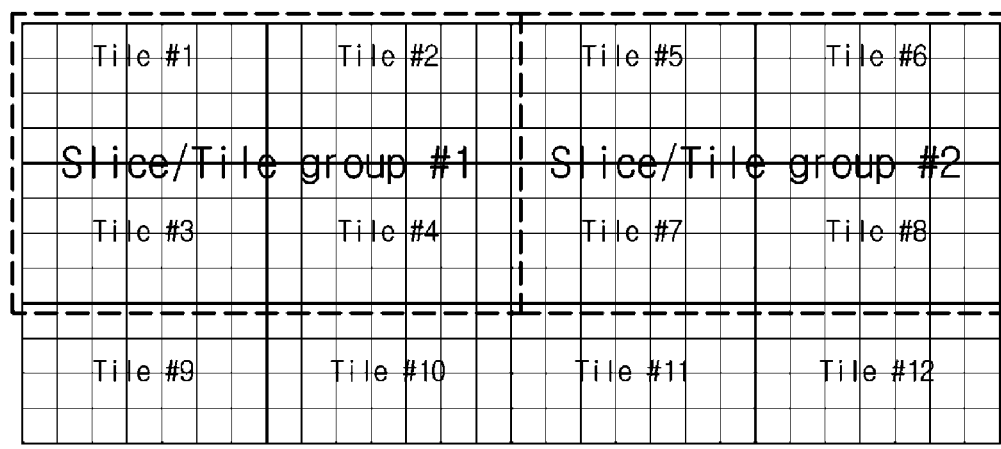
FIG. 14 is a view of an example of assigning a tile identifier within a tile group.

FIG. 14 is a view of an example of assigning a tile identifier within a tile group.

- As shown in FIG. 14, tiles within a tile group may be identified according to a raster scan order, and a tile identifier may be assigned according to the identified order.
- However, an encoding/decoding order between tiles may be a raster scan order between tiles belonging to an arbitrary tile group.
- An encoding/decoding order between tile groups may be a raster scan order between tile groups.

In an example shown in FIG. 14, an encoding/decoding order between tile groups may be an order of tile group #1 (Tile group #1), and a tile group #2 (Tile group #2) according to a raster scan order. Alternatively, an encoding/decoding order between tiles included in the tile group #1 may be an order of Tile #1, Tile #2, Tile #3, and Tile #4. In addition, an encoding/decoding order between tiles included in the tile group #2 may be an order of Tile #5, Tile #6, Tile #7, and Tile #8. Accordingly, in the example shown in FIG. 14, an encoding/decoding order between tiles may be an order of Tile #1, Tile #2, Tile #3, Tile #4, Tile #5, Tile #6, Tile #7, and Tile #8.

A CTU address (tile CTU address) within an arbitrary tile may be increased in a raster scan order.

Figure 15:
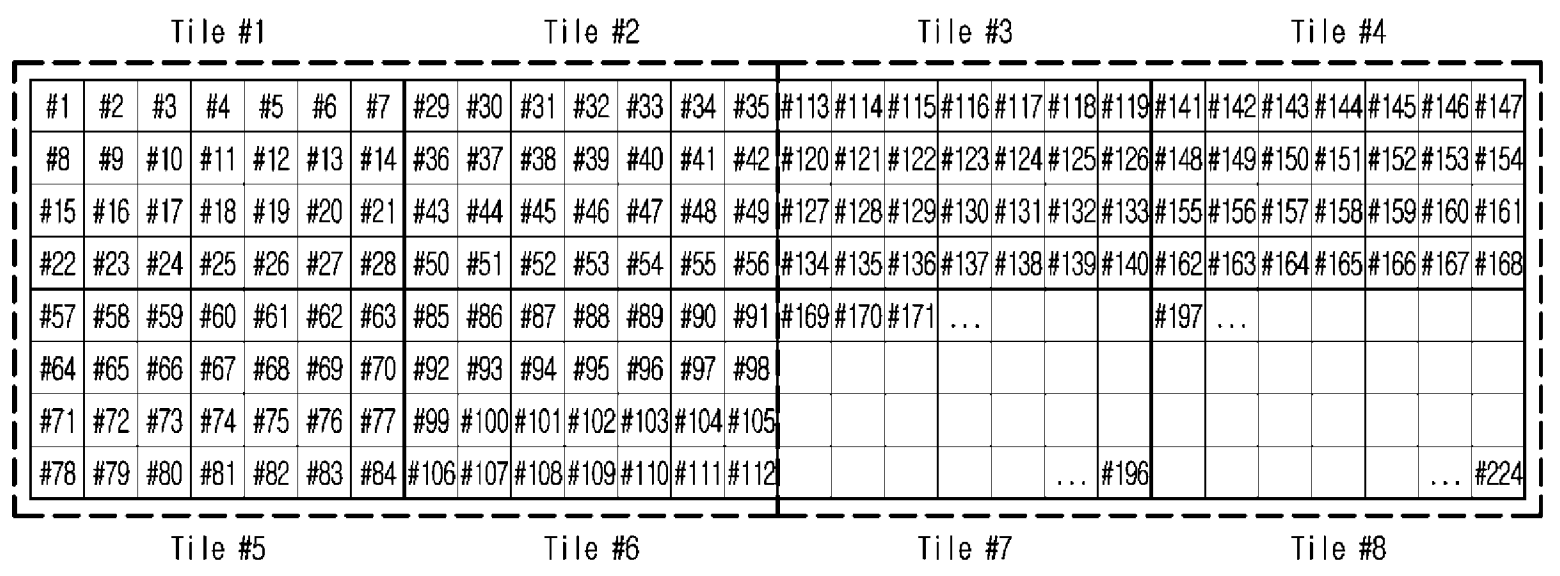

FIG. 15 is a view showing another example of assigning a CTU address within a tile.

In an example shown in FIG. 14, addresses of CTUs included in Tile #1, Tile #2, Tile #3, Tile #4, Tile #5, Tile #6, Tile #7, and Tile #8 may be represented as shown in FIG. 15. In other words, Tile #1 may include CTU addresses of #1 to #28, Tile #2 may include CTU addresses of #29 to #56, and Tile #3 may include CTU addresses of #57 to #84.

FIG. 16 is a view showing an example of a picture CTU address.

Tile CTU addresses shown in FIG. 15 may be converted into picture CTU addresses shown in FIG. 10. For example, tile CTU addresses included in Tile #1 to Tile #8 of FIG. 15 may be converted into picture CTU addresses shown in FIG. 16, and then encoding and decoding may be performed.

Alternatively, for example, CTU addresses included in a specific tile may be determined by combining methods described with reference to FIGS. 10 to 16.

When signaling at least one slice (or tile group), a header of the slice (or tile group) may include all types of information required for decoding the corresponding slice (or tile group).

Alternatively, all types of information required for decoding a slice (or tile group) constituting a picture may be included only in a parameter set or in a header of specific slice (or tile group). Herein, a header of another slice (or tile group) may include at least one of the first CTU address (identifier or index) of a corresponding slice (or tile group), the first tile identifier of the corresponding slice (or tile group), an identifier (indicator or index) of the corresponding slice (or tile group), an identifier indicating a parameter set used by the corresponding slice (or tile group), and an identifier of a specific slice (or tile group) including header information used by the corresponding slice (or tile group).

Information that is not signaled through a header of a corresponding slice (or tile group) but required for decoding may be identified by using an identifier of a specific slice (or tile group) including the required header information. Accordingly, an amount of header information transmitted on the basis of a slice (or tile group) can be decreased.

Meanwhile, when an ROI is provided, obtaining the corresponding ROI may be easily performed by using a slice (or tile group) with a rectangle shape. For example, obtaining only a slice (or tile group) including a specific ROI from a bitstream may be easier than obtaining encoding information of a specific tile included within a bitstream.

Hereinafter, the present invention will be described by distinguishing between partitioning a picture and encoding and decoding based on the resulting unit.

Partitioning a Picture

An indicator (flag, index, tiles_enabled_flag, etc.) representing whether or not a single picture is configured with at least two tiles may be signaled through a slice header, a tile group header, a parameter set such as a picture parameter set, and a sequence parameter set. For example, when an indicator has a first value (for example, 0), it may represent that a single picture is configured with a single tile. When an indicator has a second value (for example, 1), it may represent that a single picture is configured with at least two tiles.

When the indicator has a second value, that is, a single picture is configured with at least two tiles, tile related information, and a tile boundary filtering indicator (flag, index, loop_filter_across_tiles_enabled_flag, etc.) representing whether or not to apply an in-loop filter to a tile boundary may be signaled through a slice header, a tile group header, and a parameter set such as a picture parameter set, and a sequence parameter set.

When the tile boundary filtering indicator has a first value (for example, 0), it may represent that an in-loop filter is not applied to a boundary where two tiles become in contact. When the tile boundary filtering indicator has a second value (for example, 1), it may represent that an in-loop filter is applied to a boundary where two tiles become in contact. The in-loop filter may include at least one of a deblocking filter, a sample adaptive offset filter, and an adaptive loop filter.

Tile related information may include a number of tiles included in a single picture, a size of each tile, a position of each tile, a default unit representing a tile size, etc. When size information on a tile and position information on the tile are not included in tile related information, tile related information such as size information on a tile, position information on the tile, CTU addresses included with the tile, etc. may be derived by using another information included in the tile related information.

Size information on a tile may include, for example, information on horizontal and vertical lengths of the tile, an upper-left pixel position and a lower-right pixel position of the tile, etc. Herein, the upper-left pixel position and the lower-right pixel position of the tile may correspond to position information on the tile.

A default unit representing a tile size may be represented in a form of at least one of below.

A default unit of a tile size may include at least one of a specific number of CTUs, a block having specific horizontal and vertical lengths, a block having an arbitrary size configured with at least one pixel, etc. A default unit of a tile size may be represented, for example, in a syntax form such as tile_size_unit, and tile_size_unit may mean a number of pixels, a number of blocks having a predetermined size, or a number of CTUs which is a default unit of a tile size. The predetermined size may be predefined, or signaled in a sequence or picture level.

A default unit of a tile size may be divided into a horizontal length default unit and a vertical length default unit, and signaled according thereto. A horizontal length default unit may be N times of a CTU horizontal length, and a vertical length default unit may be M times of a CTU vertical length. Herein, N and M may be an arbitrary integer value equal to or greater than 1. Alternatively, a horizontal length default unit may be N pixels, and a vertical length default unit may be M pixels. For example, a horizontal default unit of a tile may be represented in a syntax form such as tile_column_size_unit, and represent a number of pixels or a multiple of a horizontal length of a CTU. In addition, for example, a vertical default unit of a tile may be represented in a syntax form such as tile_row_size_unit, and mean a number of pixels or a multiple of a vertical length of a CTU.

A default unit of a tile may not be signaled, and a value predefined in the encoder and the decoder may be used therefor.

A picture may be variably partitioned into tiles of a rectangle region. Tile related information may be represented in various methods according to various forms of partitioning a picture into tiles.

A tile may be obtained by dividing a picture by horizontal and vertical grid patterns. A tile constituting a picture may have the same horizontal length and the same vertical length. Alternatively, a horizontal length and/or a vertical length of all tiles included in a picture may be constant. Information for representing that a horizontal length and/or a vertical length of all tiles are constant may be signaled. In addition, when a horizontal length and/or a vertical length of all tiles included in a picture are constant, information on a horizontal length and information on a vertical length may be signaled.

Figures 17, 18:
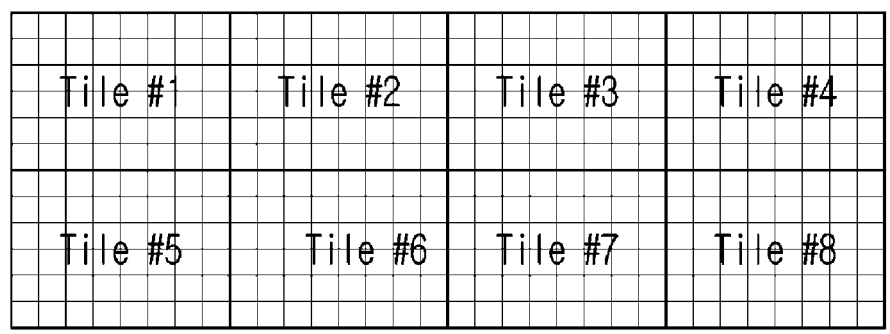
FIG. 17 is a view showing an example of configuring a single picture with tiles with the same size.
FIG. 18 is a view showing an example of signaling tile related information.

FIG. 17 is a view showing an example of configuring a single picture with tiles with the same size.

In order to represent a tile size, information representing a number of tile columns within a picture (a number of tiles in a horizontal direction) (for example, num_tile_columns_minus1 means a number of tiles in a horizontal direction−1), and information representing a number of tile rows (a number of tiles in a vertical direction) (for example, num_tile_rows_minus1 may mean a number of tiles in a vertical direction−1) may be signaled.

A size and/or a position of each tile may be derived by using information on a default unit of a tile size, a number of tile columns and tile rows (a number of tiles in a horizontal direction and a number of tiles in a vertical direction), a horizontal length and a vertical length of a picture, CTU size information, etc.

In an example shown FIG. 17, a number of tiles in a horizontal direction is four, and a number of tiles in a vertical direction is two, and thus the total number of tiles is eight. When a picture has a resolution of 1920×1080, a size of each tile becomes 480×540.

FIG. 18 is a view showing an example of signaling tile related information.

FIG. 19 is a view showing another example of signaling tile related information.

In order to signal tile related information, a part or the entire of signaling methods shown in FIG. 18 and/or FIG. 19 may be used.

In addition, an indicator (index, flag, uniform_spacing_flag, etc.) representing whether or not sizes of tiles within a picture are uniform may be signaled. When the corresponding indicator has a first value (for example, 0), it may mean that sizes of tiles within a picture are not uniform. When the corresponding indicator has a second value (for example, 1), it may mean that sizes of tiles within a picture are uniform.

Tiles may be obtained by dividing a picture by horizontal and vertical grid patterns. Herein, a horizontal length and/or a vertical length of a tile constituting a picture may be variably set to an arbitrary value.

FIG. 20 is a view showing an example of configuring a picture with tiles having different horizontal lengths and vertical lengths.

When an indicator representing whether or not tiles are identical in size within a picture has a first value, that is, sizes of tiles within a picture are not uniform, tile related information may be signaled as below.

In order to represent a tile size, as many as a number of tiles in a horizontal direction, information on a horizontal length of a tile may be sequentially signaled from the left to the right direction of a picture. In addition, as many as a number of tiles in a vertical direction, information on a vertical length of a tile may be sequentially signaled from the upper to the low direction of the picture. Herein, signaled information on the horizontal length or signaled information on the vertical length may be represented on the basis of a default unit of a tile size.

FIG. 21 is a view showing still another example of signaling tile related information.

In an example of FIG. 20, a picture may be partitioned into tiles of 3×4. Herein, a horizontal length and/or vertical length of each tile may be different.

When a horizontal default unit of a tile size is a horizontal length of a CTU, and a vertical default unit of the tile size is a vertical length of the CTU, a size of Tile #1 may be represented as (8×CTU horizontal length)×(3×CTU vertical length). Herein, 7 may be signaled as information on a horizontal length of Tile #1 (for example, column_width minus1[0]=7), and 2 may be signaled as information on a vertical length of Tile #1 (for example, row_height_minus1 [0]=2). When a CTU horizontal length and a CTU vertical length are 128, a horizontal length of Tile #1 may be (8×128), and a vertical length may be (3×128).

In the above-described two examples, it is limited in that tiles are obtained by dividing a picture by horizontal and vertical grid patterns. However, in order to provide more efficient parallel processing and an ROI, tiles with various shapes may be required.

FIG. 22 is a view showing an example of partitioning a picture into tiles with various sizes.

As shown in FIG. 22, vertical lengths of tiles positioned in the same row may be set to be identical, and horizontal lengths thereof may be set to be different. Herein, vertical lengths of tiles positioned in another row may be different.

In an example of FIG. 22, as tile related information, information on a vertical length of each tile row and information on a horizontal length of each tile included in each tile row may be signaled. For example, as information on a vertical length, row_height_minus1[i] corresponding to (a vertical length of an i-th tile row−1) may be signaled. For example, as information on a horizontal length, column_width_minus1[i][j] corresponding to (a horizontal length of a j-th tile of an i-th tile row−1) may be signaled.

FIG. 23 is a view showing an example of signaling tile related information according to an example of FIG. 22.

Herein, signaled information on a horizontal length and/or signaled information on a vertical length may be signaled on the basis of a default unit of a tile size.

FIG. 24 is a view showing another example of partitioning a picture into tiles with various sizes.

As shown in FIG. 24, horizontal length of tiles positioned at the same column may be set to be identical, and vertical lengths thereof may be set to be different. Herein, horizontal lengths of tiles present in another column may be different.

In an example shown in FIG. 24, as tile related information, information on a horizontal length of each tile column and information on a vertical length of each tile included in the tile column may be signaled. For example, as information on a horizontal length, column_width_minus1[i] corresponding to (a horizontal length of an i-th tile column−1) may be signaled. For example, as information on a vertical length, row_height_minus1[i][j] corresponding to (a vertical length of a j-th tile of an i-th tile column−1) may be signaled.

FIG. 25 is a view showing an example of signaling tile related information according to an example of FIG. 24.

Herein, signaled information on a horizontal length and/or signaled information on a vertical length may be signaled on the basis of a default unit of a tile size.

FIG. 26 is a view showing another example of partitioning a picture into tiles with various sizes.

Examples described with reference to FIGS. 22 to 25 may provide tiles with various sizes and shapes within a picture. However, there is a limit on representing sizes and shapes of tiles. For example, a configuration of a tile shown in an example of FIG. 26 may not be available. However, in order to provide parallel processing and improve the degree of freedom of an ROI, it may be required to configure a horizontal length and a vertical length of a tile within a picture to be different as shown in FIG. 26.

In addition, in order to transfer such a tile partitioning method to the decoder, signaling tile related information on each tile included in a picture may be required. Meanwhile, a case may be present where a picture is configured with tiles with the same size, for signaling efficiency, when a picture is configured with tiles with the same size, a number of horizontal and vertical tiles included in a picture may be signaled. If not, tile related information on each tile included in a picture may be signaled.

An indicator (index, flag, uniform_spacing_flag, etc.) representing whether or not a picture is configured with tiles with the same size may be signaled. When the corresponding indicator has a first value (for example, 0), it may represent that tiles within a picture are not identical in size. When the corresponding indicator has a second value (for example, 1), information representing a number of tiles in a horizontal direction and information representing a number of tiles in a vertical direction may be signaled. For example, as information representing a number of tiles in a horizontal direction, num_tile_columns_minus1 corresponding to (a number of tiles in a horizontal direction−1) may be signaled. For example, as information representing a number of tiles in a vertical direction, num_tile_rows_minus1 corresponding to (a number of tiles in a vertical direction−1) may be signaled.

A size and a position of each tile may be derived by using information on a default unit of a tile size, a number of tiles in a horizontal direction and a number of tiles in a vertical direction, a horizontal length and a vertical length of a picture, information on a CTU size, etc.

In addition, when a corresponding indicator has a first value, that is, when tiles within a picture are not identical in size, information for deriving a size and a position of each tile included in the picture may be signaled as tile related information. Herein, tile related information may be, for example, a number of tiles present within a picture, information on a horizontal length of each tile, information on a vertical length of each tile, etc.

An order of signaling tiles within a picture may be determined as a raster scan order on the basis of an upper-left position of the tile. Herein, a tile size and a position within the picture, and an address of a CTU included in a tile may be determined on the basis of tile related information.

FIG. 26 is a view of an example showing an order of signaling tiles which is determines as a raster scan order on the basis of an upper-left position of a tile.

For example, as shown in FIGS. 27 to 29, as information on a number of tiles present within a picture, num_tile_in_picture_minus1 corresponding to (the total number of tiles included in a picture−1) may be signaled.

FIG. 27 is a view showing an example of signaling a horizontal length and a vertical length of each tile included in a picture. Herein, signaled information on a horizontal length or signaled information on a vertical length may be signaled on the basis of a default unit of a tile size.

As a tile is a rectangle, a size and a position of the tile, and an address (or position) of a CTU constituting the tile may be derived when an upper-left position and a lower-right position of the tile are provided.

FIG. 28 is a view showing an example of signaling an upper-left position and a lower-right position of each tile included in a picture.

An upper-left position or lower-right position may be information on an identifier based on a default unit of a tile size. For example, the upper-left position or lower-right position may be represented as a CTU address or pixel address.

For example, when a default unit of a tile size is a CTU, an upper-left index (top_left tile unit idx[i](upper-left index of an i-th tile)) of a tile may be an identifier of a CTU positioned at the upper-left of the corresponding tile. In addition, a lower-right index (bottom_right_tile unit_idx[i] (lower-right index of an i-th tile)) of the tile may be an identifier of a CTU positioned at the lower-right of the corresponding tile.

As above, meaning of the signaled upper-left index and the signaled lower-right index may vary according to a default unit of a tile size. For example, when a default unit of a tile is a CTU, an upper-left index and a lower-right index may be a CTU address, and when a default unit of a tile is a pixel, an upper-left index and a lower-right index may be a pixel position. In addition, when a default unit of a horizontal length of a tile is (N*CTU horizontal length) and a default unit of a vertical length is (M*CTU vertical length), a CTU address of the upper-left position corresponding to an upper-left position may be derived as N*M*(K−1)+1 when an upper-left index represent a default unit of a K-th tile.

As shown in FIG. 27, when information on a horizontal length and information on a vertical length of each tile are only signaled, a CTU address (or pixel address) included in each tile may be derived by sequentially deriving from a CTU address (or pixel address) of the first tile.

On the other hand, in an example shown in FIG. 28, a CTU address (or pixel address) included in each tile may be easily derived by signaling identifier information (or CTU address or pixel address) on the basis of a default unit (tile unit) of a tile which indicates the upper-left and the lower-right of each tile.

FIG. 29 is a view showing an example of signaling an upper-left position of each tile included in a picture, and a horizontal length and a vertical length of a tile.

In an example of FIG. 29, there is proposed a signaling method for compensating the example of FIG. 27 where deriving is sequentially performed from a CTU address (or pixel address) of the first tile so as to derive a CTU address (or pixel address) included in each tile.

In an example of FIG. 29, an upper-left position of each tile may be signaled by using identifier information (or CTU address or pixel address) based on a default unit (tile unit) of a tile which indicates the corresponding position. In addition, in the example of FIG. 29, in addition thereto, information on a horizontal length and information on a vertical length of each tile may be signaled.

Comparing with an example of FIG. 28, an amount of bit rate generated during signaling according to an example of FIG. 29 is relatively decreased when a number of CTUs included in a picture becomes large and a default unit of a tile does not become large. In addition, comparing with an example of FIG. 28, in an example of FIG. 29, an address (or pixel address) of a CTU included in each tile may be easily derived by signaling a start position (upper-left position) of each tile, and a horizontal length and a vertical length of a tile.

FIG. 30 is a view showing another example of signaling tile related information.

FIG. 31 is a view showing still another example of signaling tile related information.

In examples of FIGS. 27 to 29, signaling efficiency is improved by signaling information on whether a picture is configured with tiles with the same size when a picture is configured with tiles with the same.

On the other hand, in examples of FIGS. 30 and 31, information on whether or not a size of current tile is identical to a size of a just previous tile according to a signaling order between tiles and/or a encoding/decoding order may be signaled. According to the above, when a size of a current tile is identical to a size of a previous tile, the size of the current tile is not signaled so as to improve signaling efficiency.

When an indicator (index, flag, use_previous_tile_size_flag, etc.) representing whether or not a size of a current tile is identical to a size of a just previous tile has a first value (for example, 0), it may represent that a size of a current tile and a size of a just previous tile are not identical. Herein, information on a size and a position of each tile may be signaled. Meanwhile, when the corresponding indicator has a second value (for example, 1), it may represent that a size of a current tile is identical to a size of a just previous tile. Herein, information on the size of the current tile may not be signaled.

In examples of FIGS. 26 to 31, a tile partitioning method and a signaling method may provide too many degrees of freedom. For example, an example of FIG. 26 is an extreme example where tiles with various sizes are included within a picture. As there is no limit on a size or position of tile in the example of FIG. 26, the encoder and the decoder may increase in implementation complexity. Accordingly, there is a need to adequately ensure the degree of freedom of a tile size and a tile position, while simultaneously limiting the implementation complexity of the encoder and the decoder to an appropriate level.

An embodiment that will be described hereinafter may satisfy both of the appropriate degree of freedom and the appropriate implementation complexity compared with examples of FIGS. 26 to 31.

A single picture may be configured with at least one tile, and a single tile may be configured with at least one sub-tile.

A sub-tile may include features identical to those of a tile which are described when describing encoding. When a sub-tile includes features identical to those of a tile, a tile described in the present specification may be referred to the above-described tile group. In other words, a tile group may be configured with at least one tile, and a tile may be configured with at least one sub-tile. Therefore, a relation between a tile and a sub-tile may be identical to a relation between a tile group and a tile which is described above.

Accordingly, the above-described description related to the tile group and the tile may be identically applied to a tile and a sub-tile.

Sub-tiles may be obtained by partitioning a picture by grid patterns in a horizontal direction and a vertical direction as a tile of FIG. 17 or 20. Herein, sizes of sub-tiles within a picture may be identical as a tile of FIG. 17, or lengths of sub-tile columns and sub-tile rows may be different as a tile of FIG. 20.

FIG. 32 is a view showing an example of partitioning a picture into sub-tiles.

A default unit of a sub-tile size may be at least one of a specific number of CTUs, a block having a specific horizontal length and a specific vertical length, a block having an arbitrary size configured with at least one pixel, etc. In addition, a default unit of a horizontal length and a default unit of a vertical length of a sub-tile size may be different. A default unit of a horizontal length (or default unit of a vertical length) may be N times of a CTU horizontal length (or vertical length), and N may be an arbitrary integer equal to or greater than 1.

For example, as shown in examples of FIGS. 34 and 35, a default unit of a sub-tile may be represented in a syntax form such as subtile_size_unit. subtile_size_unit may mean a number of pixels or number of CTUs which is a default unit of a tile size. Herein, it may be predefined that a default unit is a number of pixels or N times of a CTU. In detail, when a default unit is defined as N times of a CTU, and a CTU size is 128×128 and a value of 5 is signaled as subtile_size_unit, a default unit of a sub-tile size may be a block of a (128*5)×(128*5) size.

Alternatively, for example, as examples shown in FIGS. 34 and 35, a default unit of a horizontal length of a sub-tile may be represented as subtile_column_size_unit, and represent a number of pixels or a multiple of a horizontal length of a CTU. In addition, a default unit of a vertical length may be represented as subtile_row_size_unit, and mean a number of pixels or a multiple of a vertical length of a CTU. Herein, it may be predefined that a default unit is a number of pixels or N times of a CTU. In detail, when a horizontal length is defined as N times of a CTU, and a horizontal length of a CTU is 128 and a value of 2 is signaled as subtile_column_size_unit, a default unit of a horizontal length of a sub-tile may be 128*2.

A default unit of a sub-tile may not be signaled, and a value predefined in the encoder and the decoder may be used.

FIG. 34 is a view showing an example of signaling a size and a position of a sub-tile.

FIG. 35 is a view showing another example of signaling a size and a position of a sub-tile.

A shape (size and position) of a sub-tile may be represented as examples of FIGS. 34 and 35 by using syntaxes described in examples of FIGS. 18, 19, and 21. For example, as information representing a number of sub-tile columns (a number of sub-tiles in a horizontal direction), num_subtile_columns_minus1 corresponding to (a number of sub-tile columns−1) may be signaled. For example, as information representing a number of sub-tile rows (a number of sub-tiles in a vertical direction), num_subtile_rows_minus1 corresponding to (a number of sub-tile rows−1) may be signaled.

When all sizes of sub-tiles within a picture are identical as tiles shown in FIG. 17, a size and a position of each sub-tile may be derived by using information on a default unit of a sub-tile size, a number of sub-tile columns, a number of sub-tile rows, a horizontal length and a vertical length of a picture, CTU size information, etc.

When sizes of sub-tiles within a picture are different according to a number of sub-tile columns and/or a number of sub-tile rows as tiles shown in FIG. 20, in order to represent a size of a sub-tile, as many as a number of sub-tile columns (a number of sub-tiles in a horizontal direction), information on a horizontal length of a sub-tile may be sequentially signaled from the left to the right direction of a picture. In addition, as many as a number of sub-tile rows (a number of sub-tiles in a vertical direction), information on a vertical length of a sub-tile may be sequentially signaled from the upper to the lower direction of a picture. Herein, signaled information on a horizontal length or signaled information on a vertical length may be signaled on the basis of a default unit of a sub-tile size.

Figure 33:
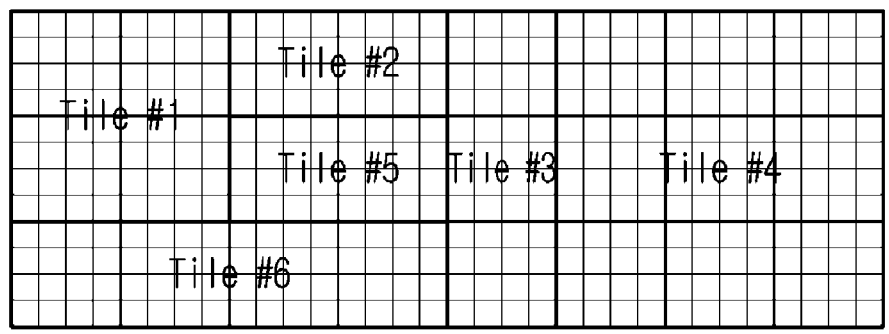
FIG. 33 is a view showing an example of configuring a tile on the basis of a sub-tile of FIG. 32.

FIG. 33 is a view showing an example of configuring a tile on the basis of a sub-tile of FIG. 32.

A tile may be configured with one or more adjacent sub-tiles. As a tile is a rectangle, a tile size, a tile position, sub-tiles constituting the tile, and a CTU address or CTU position may be derived by signaling information on a sub-tile positioned at the upper-left of each tile, and information of a sub-tile positioned at lower-right of each tile.

For example, as an example of FIG. 34, an index (top left subtile idx[i](upper-left index of an i-th tile)) of a sub-tile positioned at the upper-left of a tile may mean a number or address of a sub-tile positioned at the upper-left of the corresponding tile. In addition, an index (right bottom subtile idx[i](lower-right index of an i-th tile)) of a sub-tile positioned at the lower-right of a tile may mean a number or address of a sub-tile positioned at the lower-right of the corresponding tile.

Sub-tiles included in a tile may be derived by using signaled information. In addition, addresses of CTUs included in a sub-tile may be derived. Meanwhile, rather than signaling information on upper-left and lower-right sub-tiles constituting a tile, a tile size, a tile position, sub-tiles constituting a tile, a CTU address or CTU position may be derived by signaling information on an upper-left sub-tile constituting the tile, and a horizontal length and a vertical length of the tile.

In an example of FIG. 33, in case of Tile #3, at least one sub-tile may be obtained by partitioning a tile in a horizontal direction. In other words, horizontal lengths of sub-tiles included in the corresponding tile may be identical. In the above case, as sub-tile related information for deriving a position and/or a size of a sub-tile included in the tile, information on a vertical length of a sub-tile may be signaled. As a horizontal length of a sub-tile is identical to a horizontal length of a tile, information on a horizontal length of a sub-tile may not be signaled. As Tile #3 of FIG. 33, all sub-tiles included in a tile may have the same vertical length. Herein, as sub-tile related information, an indicator indicating that vertical lengths of sub-tiles within a tile are uniform, and information on a vertical length of a sub-tile may be signaled. When vertical lengths of sub-tiles included in a tile are different, as sub-tile related information, an indicator indicating that vertical lengths of sub-tiles within a tile are not uniform, a number of sub-tiles within a tile, and information on a vertical length of each sub-tile may be signaled.

A default unit of a sub-tile may be a CTU, and the above-described information on a vertical length of a sub-tile may be represented as a number of CTU rows. When a tile is configured with at least one CTU row, partitioning a tile into at least two sub-tiles may not be available. Accordingly, information on whether or not to partition a tile into at least two sub-tiles may be only signaled when a tile includes at least two CTU rows. In addition, a tile configured with at least two CTU rows is partitioned into two sub-tiles having a vertical length corresponding to a single CTU. In other words, vertical lengths of two sub-tiles are uniform. Accordingly, an indicator indicating that lengths of sub-tiles included in a tile are uniform may be only signaled when a tile configured with at least two CTU rows is partitioned into at least two sub-tiles.

For example, as an example of FIG. 35, as an index of a sub-tile positioned at the upper-left of a tile, top_left_sub-tile_idx[i](index of an upper-left sub-tile of tan i-th tile) may be signaled. In addition, column_width minus1[i](corresponding to (a horizontal length of an i-th tile−1)) may be signaled as information on a horizontal length, and row_height_minus1[i](corresponding to (a vertical length of an i-th tile−1)) may be signaled as information on a vertical length.

Similar to examples of FIGS. 30 and 31, in order to efficiently signal a tile size, a size of a current tile may not be signaled according to an indicator (index, flag, use_previous_tile_size_flag, etc.) representing whether or not a size of a current tile is identical to a size of a just previous tile.

In the above-described example, when a number of tiles within a picture is at least two, an identifier of the tile may be determined according to an order of signaling tiles. For example, when a number of tiles within a picture is num_tiles_in_picture, and information on a tile size is signaled by increasing i from 0 to num_tiles_in_picture by 1, i may be an identifier of the corresponding tile.

Performing Encoding/Decoding Based on a Resulting Unit Obtained by Picture Partitioning A single picture may be encoded and decoded on the basis of a corresponding tile group in an ascending order from a tile group having an identifier of a small value. Within the same tile group, encoding and decoding may be performed on a corresponding tile in an ascending order from a tile having an identifier of a small value. Within the same tile, encoding and decoding may be performed on a corresponding CTU in an ascending order from a CTU having an address (identifier of a small value.

At least one tile group may constitute a sub-picture that is a rectangle region within a picture. Descriptions of the present disclosure related to configurations of a tile or tile group may be applied to a configuration of a sub-picture. A tile, a tile group and/or a sub-picture may be a unit of encoding and decoding, and may be identically encoded and decoded as the picture.

A tile may be independently encoded and decoded. A tile boundary may be encoded/decoded by being identical used as a picture boundary. For example, block partitioning in a tile boundary, unlikely to general block partitioning, may be identical to block partitioning applied to a picture boundary. For example, in a right tile boundary (or lower tile boundary), binary partitioning in a vertical direction (or horizontal direction) may be implicitly performed. In addition, padding in a tile boundary may be identical to padding in a picture boundary.

Alternatively, in place of a tile boundary, a boundary of a tile group may be identically encoded/decoded as a picture boundary.

Alternatively, a tile boundary or boundary of a tile group may be identically encoded/decoded as a slice boundary or boundary of a predetermined unit.

When a single picture is reconstructed on the basis of a reconstructed tile, image deterioration or image difference may occur in a tile boundary (that is, where two tiles become in contact) due to independent encoding and decoding of tiles. In order to reduce such image deterioration or image difference, an in-loop filter may be applied to a tile boundary.

However, in order to apply an in-loop filter to a tile boundary, additional resource such as providing a line buffer in a vertical direction is required, and thus an indicator (flag) representing whether or not to apply an in-loop filter to a tile boundary may be signaled through a parameter set.

The encoder may select whether or not to apply an in-loop filter to a tile boundary. When an in-loop filter is not applied, or even when applied, to a tile boundary, in order to reduce image deterioration or image difference in a tile boundary, a tile boundary may be encoded by performing padding/expanding to pixels adjacent to the tile boundary when performing tile encoding.

Figure 36:
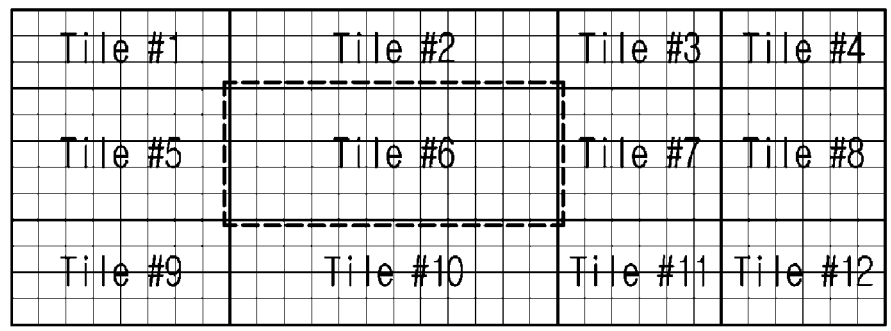
FIG. 36 is a view showing a process of performing encoding/decoding on a tile boundary.

FIG. 36 is a view showing a process of performing encoding/decoding on a tile boundary.

In an example shown in FIG. 36, a tile size of Tile #6 is 12×5. In case of Tile #6, encoding may be performed after performing padding/expanding until N pixels adjacent to the upper boundary of a tile, that is, pixels corresponding to N lower rows of Tile #2. In addition, in case of Tile #6, encoding may be performed after performing padding/expanding until N pixels adjacent to the right boundary of a tile, that is, pixels corresponding to N left columns of Tile #7. Similarly, for the left boundary and the lower boundaries of Tile #6, padding/expanding may be performed until N pixels. The N may be an arbitrary integer value. A number of pixels padded/expanded for each boundary may be different.

As Tile #1, among vertical and horizontal boundaries of a tile, a boundary where pixels to be padded/expanded are not present may be present. For example, when a boundary of a corresponding tile corresponds to a picture boundary. In such a case, padding or expanding may not be performed on the corresponding boundary. Similarly, when a boundary of a corresponding tile corresponds to a boundary of a tile group where the corresponding tile is included, padding or expanding may not be performed on the corresponding boundary.

The above-described description of performing padding/expanding on a tile boundary may be identically applied to a boundary of a tile group. In other words, encoding for a corresponding tile group may be performed after performing padding/expanding until pixels adjacent to a boundary of a tile group.

When performing decoding, a reconstructed pixel of a region may be generated by performing a weighted sum on pixels values of a padded/expanded region of a reconstructed tile, and reconstructed pixel values of the padded/expanded region of an adjacent tile including the corresponding region.

Figure 37:
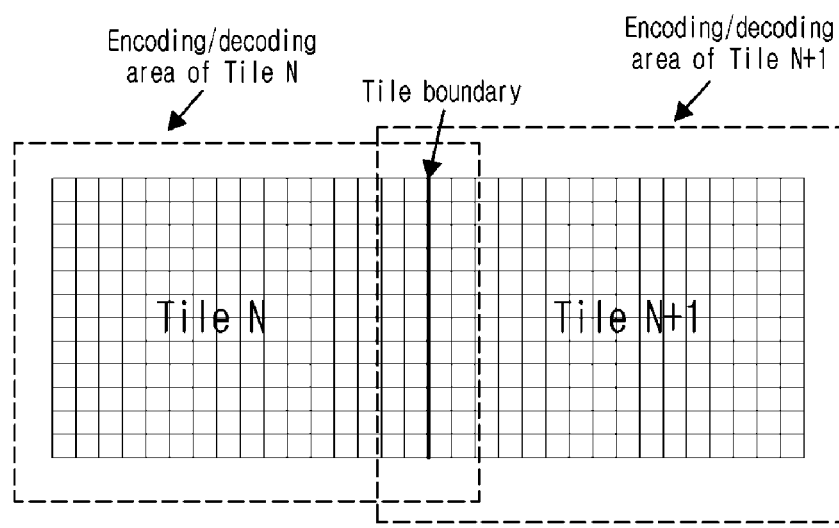
FIG. 37 is a view showing an example of performing encoding after performing padding/expanding on a tile boundary.

FIG. 37 is a view showing an example of performing encoding after performing padding/expanding on a tile boundary.

In an example of FIG. 37, a right boundary of Tile N and a left boundary of Tile N+1 are in contact with each other. Tile N is encoded after pixels of two left columns of Tile N+1 adjacent to the right boundary of Tile N are padded/expanded to Tile N. Similarly, Tile N+1 is encoded after pixels of two right columns of Tile N adjacent to the left boundary of Tile N+1 are padded/expanded to Tile N+1. In the example of FIG. 37, pixels of two columns are padded/expanded. However, it is not limited thereto, pixels of M (M is an arbitrary positive integer) columns may be padded/expanded.

In the decoder, reconstructed Tile N may include pixels of two left columns of Tile N+1, and reconstructed Tile N+1 may include pixels of two right columns of Tile N. Accordingly, in boundaries of Tile N and Tile N+1, pixels from the two left columns to the two right columns are respectively reconstructed in Tile N and Tile N+1, pixels of the four columns may respectively have two overlapping reconstructed values. A final reconstructed pixel value may be generated by a weighted sum of the two overlapping reconstructed values.

For example, when (x, y) is a pixel position of an overlapping part between Tile N and Tile N+1, P(x, y) is a reconstructed pixel value in Tile N, and Q(x, y) is a reconstructed pixel value in Tile N+1, a final reconstructed pixel value K(x, y) may be represented as a*P(x, y)+(1−a)*Q(x, y). Herein, a weighting factor a may be a value between 0 to 1 such as ¼, ½, ¾, etc.

A weighting factor a may be a fixed value predetermined in the encoder and the decoder. When a weighting factor is not predetermined, information on a weighting factor a may be signaled in a parent level such as a slice header, a tile group header, a parameter set such as a sequence parameter set, and a picture parameter set. In addition, an indicator indicating whether or not a weighting factor a is a fixed value may be signaled in a parent level such as a slice header, a tile group header, and a parameter set such as a sequence parameter set and a picture parameter set.

When performing padding/expanding on a tile, one of below may be applied rather than using an adjacent pixel.

Padding/expanding may be performed by copying partial pixels of a tile boundary. For example, padding/expanding on a right tile boundary may be performed by copying pixels of the rightmost column of the tile by N times. Padding/expanding for an upper boundary, a left boundary or a lower boundary of the tile may be identically performed.

In case of a 360-degree video, various projections formats including a cubemap may be provided. When a 360-degree video is converted into a 2D image by using such a projection format through packaging, discontinuity occurs between faces on which packaging is performed.

Figure 38:
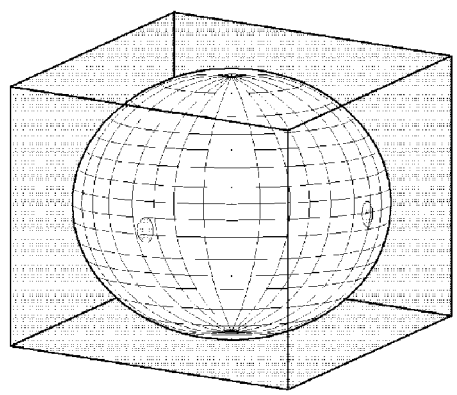
FIG. 38 is a view showing an example of disposing a 360-degree image in a sphere form within a hexagon.
Figure 39:
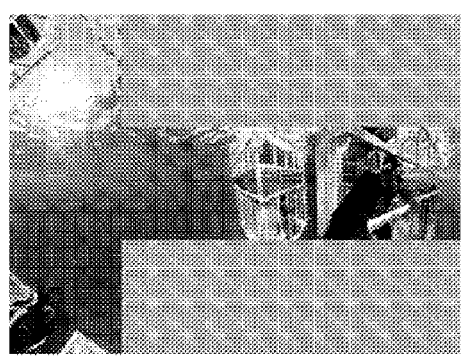
FIG. 39 is a view showing an example of performing projection on each face of the hexagon of FIG. 38 and deploying the hexagon.
Figure 40:
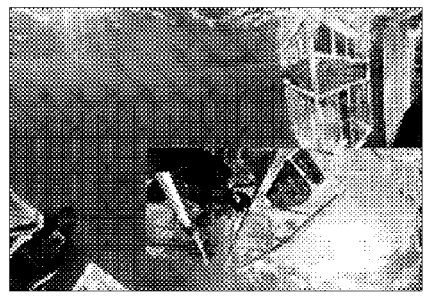
FIG. 40 is a view showing an example of performing packaging for an example of FIG. 39 into a 2D image.

FIGS. 38 to 40 are views respectively showing performing a 2D image projection for a 360-degree video by using a cubemap.

FIG. 38 is a view showing an example of disposing a 360-degree image in a sphere form within a hexagon.

FIG. 39 is a view showing an example of performing projection on each face of the hexagon of FIG. 38 and deploying the hexagon.

Each face of FIG. 39(*a*) means each face (top, front, right, back, left, and bottom) of the hexagon of FIG. 38 as shown in FIG. 39(*b*).

FIG. 40 is a view showing an example of performing packaging for an example of FIG. 39 into a 2D image.

Generally, in order to increase encoding efficiency, rather than encoding a 2D image in a form of FIG. 39, encoding and decoding may be performed for an image on which packaging is performed as FIG. 40. Herein, as shown in FIG. 40, a case may be present where continuity between faces on which packaging is performed is not present. For example, continuity is not present between a face "bottom" and a face of "left" in FIG. 40. Accordingly, when encoding each face as an independent tile, it is preferable to perform padding/expanding until partial pixels adjacent in a 360-degree image rather than padding/expanding until pixels of an adjacent tile when performing padding/expanding on a tile boundary.

For example, in case of FIG. 40, padding/expanding may be performed on a right boundary of a face "Bottom" by using N low rows of a face "Right". As above, in order to perform padding/expanding on a boundary of each tile, information on which part of which boundary of which tile will be used may be predefined in the encoder and the decoder, or may be signaled. The information may include, for example, an identifier of a tile to be used for padding/expanding, an identifier of a part of a boundary to be used, etc.

When performing padding/expanding on a tile boundary by using adjacent pixels, at least one type of information of below may be signaled in a parent level such as a slice header, a tile group header, and a parameter set such as a sequence parameter set and a picture parameter set.

When encoding a tile, an indicator representing whether or not to perform padding/expanding on a tile boundary by using adjacent pixels may be signaled.

When performing padding/expanding on a tile boundary, information on a padding/expanding range, for example, information indicating that padding/expanding is performed on how many rows or how many columns may be signaled, and the information may be represented in an arbitrary integer such as 1, 2, 3, . . . , etc. When it is signaled that an indicator related to whether or not to perform padding/expanding indicates that padding/expanding is performed, information on a padding/expanding range may be signaled.

When performing padding/expanding on a tile boundary, an indicator representing whether or not a final reconstructed value is generated by a weighted sum of pixel values of regions overlapping in a tile boundary may be signaled. When it is signaled that an indicator related to whether or not to perform padding/expanding indicates that padding/expanding is performed, an indicator on whether or not to perform a weighted sum may be signaled.

When performing padding/expanding on a tile boundary, an indicator indicating whether or not a fixed weighted sum is used may be signaled when a weighted sum is used in a tile boundary. An indicator indicating whether or not a fixed weighted sum is used may be signaled only when it is signaled that an indicator indicating whether or not to perform padding/expanding indicates that padding/expanding is performed.

When performing padding/expanding on a tile boundary, information on a weighting factor (for example, a value of a weighting factor, an index (indicator, flag, etc.)) representing a weighting factor) may be signaled when a weighted sum is used in a tile boundary. Information on a weighting factor may be signaled only when it is signaled that an indicator related to whether or not to perform padding/expanding indicates that padding/expanding is performed.

When performing padding/expanding on a tile boundary, an identifier of a tile including pixels to be used in padding may be signaled.

When performing padding/expanding on a tile boundary, an identifier (for example, right boundary, left boundary, lower boundary or upper boundary) representing a boundary of a tile including pixels to be used in padding may be signaled.

The above-described encoding and decoding methods using padding/expanding in a tile boundary may be identically applied to a boundary of a tile group. Meanwhile, the above methods may not be applied to a boundary of a tile group according to complexity in the encoder and the decoder, encoding efficiency, etc.

Related on the above, an indicator (flag, etc.) representing whether or not to perform padding/expanding on a boundary of a tile group may be signaled in a parent level such as a slice header, a tile group header, and a parameter set such as a sequence parameter set or picture parameter set. In addition, the above-described information related to padding/expanding on a tile boundary (for example, information indicating that padding/expanding is performed on how many rows or how many columns) may be signaled as information related to padding/expanding for a boundary of a tile group.

When information related to padding/expanding for a boundary of a tile group is not signaled separately, information related to padding/expanding for a tile boundary may be identically applied to a boundary of a tile group.

In addition, when a picture is configured with too many tiles, taking into account complexity in the encoder and the decoder and encoding efficiency, it is not preferable to apply padding/expanding to all boundaries. Accordingly, padding/expanding is applied to a boundary of a tile group, and not to a tile boundary. An indicator (flag, etc.) indicating the same may be signaled in a parent level such as a slice header, a tile group header, and a parameter set such as a sequence parameter set or picture parameter set.

When performing inter-encoding and inter-decoding on a tile, inter-prediction may be performed at a position within a reference picture which is in association with a position of the corresponding tile of a current picture. In other words, a region indicated by a motion vector of a block within a tile may be limited on a region within a reference picture which is in association with a position of the corresponding tile of a current picture.

Accordingly, the entire reference picture is not required for performing inter-prediction on a current tile, and a region of the reference picture in association with the current tile is required. Thus, efficiency of parallel processing can be improved when independently encoding and decoding a tile.

Herein, a region of a reference picture in association with a current tile of a current picture may be one of below.

The region may be a region within a reference picture at a position identical to a position of a current tile within a current picture, that is, co-located region.

The region may be a region within a reference picture at a position corresponding to a position where a current tile within a current picture is moved by an x pixel in a horizontal direction and by a y pixel in a vertical direction from a position of the current tile. Herein, x and y may be signaled.

When inter-encoding and inter-decoding is performed on a tile, an indicator (flag) indicating whether or not inter-prediction is performed within a position within a reference picture in association with a position of a corresponding tile of a current picture may be signaled in a parent level such as a slice header, a tile group header, and a parameter set such as a sequence parameter set or picture parameter set.

In the present disclosure, an image encoder or image decoder performing a predetermined operation may perform an operation of determining a condition or situation for performing the corresponding operation. For example, when it is disclosed that a predetermined operation is performed when a predetermined condition is satisfied, the encoder or decoder may perform the predetermined operation after determining whether or not the predetermined condition is satisfied.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image using a bitstream, the method comprising:
   deriving slice mode information on a slice included in a current picture using the bitstream;
   deriving slice identification information based on the slice mode information; and
   decoding the slice based on the slice identification information, wherein
   the slice comprises one or more blocks,
   the slice mode information indicates which mode among a first mode and a second mode is used for the current picture,
   the slice included in the current picture is configured with continuous tiles according to a raster scan order in a case that the slice mode information indicates that the first mode is used for the current picture, and
   the slice in the current picture forms a rectangle region in a case that the slice mode information indicates that the second mode is used for the current picture.

2. The method of claim 1, wherein the slice mode information is signaled through a picture parameter set.

3. The method of claim 1, wherein when the slice mode information indicates that the first mode is used for the current picture, the slice identification information includes index information on a first tile included in the slice, and information on how many tiles are included in the slice.

4. The method of claim 3, wherein the slice identification information is signaled through a slice header.

5. The method of claim 3, wherein an index of the first tile included in the slice is determined based on the slice identification information, and an index of an n-th tile included in the slice is set to a value obtained by adding 1 to an index of an (n−1)-th tile included in the slice.

6. The method of claim 1, wherein when the slice mode information indicates the second mode, the slice identification information is an index information for the slice forming the rectangle region.

7. The method of claim 6, wherein the index information of the slice is used to derive at least one of Coding Tree Unit (CTU) number information and an address of a CTU, and
   the CTU number information indicates how many CTUs are comprised in the slice.

8. The method of claim 7, wherein the CTUs comprised in the slice are decoded according to the raster scan order.

9. A method of encoding an image to generate a bitstream, the method comprising:
   determining a slice mode on a slice included in a current picture and encoding slice mode information indicating the slice mode;
   determining slice identification information based on the slice mode and encoding the slice identification information; and
   generating the bitstream comprising information indicating the slice identification information, wherein
   the slice mode information indicates which mode among a first mode and a second mode is used for the current picture,
   the slice included in the current picture is configured with continuous tiles according to a raster scan order in a case that the slice mode information indicates that the first mode is used for the current picture, and
   the slice in the current picture forms a rectangle region in a case that the slice mode information indicates that the second mode is used for the current picture.

10. The method of claim 9, wherein the slice mode information is signaled through a picture parameter set.

11. The method of claim 9, wherein when the slice mode information indicates that the first mode is used for the current picture, the slice identification information includes index information on a first tile included in the slice, and information on how many tiles are included in the slice.

12. The method of claim 11, wherein the slice identification information is signaled through a slice header.

13. The method of claim 11, wherein an index of the first tile included in the slice is encoded using the slice identification information, and an index of an n-th tile included in the slice is a value obtained by adding 1 to an index of an (n−1)-th tile included in the slice.

14. The method of claim 10, wherein when the slice mode is the second mode, the slice identification information is an index information for the slice forming the rectangle region.

15. The method of claim 14, wherein the index information of the slice is used to derive at least one of Coding Tree Unit (CTU) number information and an address of a CTU, and the CTU number information indicates how many CTUs are comprised in the slice.

16. A non-transitory computer-readable recording medium storing program instructions for transmitting a bitstream, the program instructions comprising:

an instruction to perform generating the bitstream; and
an instruction to transmit the bitstream,
wherein the generating the bitstream comprises:
determining a slice mode on a slice included in a current picture and encoding slice mode information indicating the slice mode; and
determining slice identification information based on the slice mode and encoding the slice identification information; and
generating the bitstream comprising information indicating the slice identification information, wherein the slice comprises one or more blocks,
wherein the slice mode information indicates which mode among a first mode and a second mode is used for the current picture,
wherein the slice included in the current picture is configured with continuous tiles according to a raster scan order in a case that the slice mode information indicates that the first mode is used for the current picture, and
wherein the slice in the current picture forms a rectangle region in a case that the slice mode information indicates that the second mode is used for the current picture.

17. The non-transitory computer-readable recording medium of claim 16, wherein the slice mode information is signaled through a picture parameter set.

18. The non-transitory computer-readable recording medium of claim 16, wherein when the slice mode information indicates that the first mode is used for the current picture, and the slice identification information includes index information on a first tile included in the slice and information on how many tiles are included in the slice.

19. The non-transitory computer-readable recording medium of claim 18, wherein the slice identification information is signaled through a slice header.

* * * * *